United States Patent
Liu et al.

(10) Patent No.: US 12,483,350 B2
(45) Date of Patent: Nov. 25, 2025

(54) SS MONITORING METHOD AND DEVICE

(71) Applicant: VIVO MOBILE COMMUNICATION CO., LTD., Guangdong (CN)

(72) Inventors: Siqi Liu, Guangdong (CN); Zichao Ji, Guangdong (CN); Gen Li, Guangdong (CN); Xueming Pan, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 546 days.

(21) Appl. No.: 17/891,503

(22) Filed: Aug. 19, 2022

(65) Prior Publication Data

US 2022/0399954 A1 Dec. 15, 2022

Related U.S. Application Data

(63) Continuation of application No. PCT/CN2021/076777, filed on Feb. 19, 2021.

(30) Foreign Application Priority Data

Feb. 21, 2020 (CN) .......................... 202010109200.6

(51) Int. Cl.
*H04W 4/00* (2018.01)
*H04L 1/00* (2006.01)
(Continued)

(52) U.S. Cl.
CPC ............ *H04L 1/0038* (2013.01); *H04W 24/08* (2013.01); *H04W 72/1263* (2013.01)

(58) Field of Classification Search
CPC ........ H04L 1/0038; H04L 1/00; H04W 24/08; H04W 72/1263; H04W 72/12
(Continued)

(56) References Cited

U.S. PATENT DOCUMENTS 8,433,251 B2 * 4/2013 Chen ..................... H04L 5/0094
455/352
9,084,238 B2 * 7/2015 Gao ....................... H04L 5/0016
(Continued)

FOREIGN PATENT DOCUMENTS

CN 103812602 A 5/2014
CN 103906244 A 7/2014
(Continued)

OTHER PUBLICATIONS

First Office Action for Chinese Application No. 202010109200.6, dated Aug. 23, 2022, 14 Pages.
(Continued)

*Primary Examiner* — Marceau Milord
(74) *Attorney, Agent, or Firm* — BROOKS KUSHMAN P.C.

(57) ABSTRACT

An SS monitoring method and a device. The method includes: obtaining target information, where the target information includes at least one of the following: configuration information of a first target SS and blind detection resource allocation information of the first target SS, the configuration information is used to indicate the number of blind detections in the first target SS, the blind detection resource allocation information is used to allocate the number of blind detections to an SS in the first target SS, and the number of blind detections includes at least one of the following: the number of downlink control channel candidates and the number of channel estimations; and monitoring a second target SS in the first target SS based on the target information.

18 Claims, 7 Drawing Sheets

(51) Int. Cl.
*H04W 24/08* (2009.01)
*H04W 72/1263* (2023.01)

(58) Field of Classification Search
USPC .......................................................... 370/329
See application file for complete search history.

(56) References Cited

U.S. PATENT DOCUMENTS

| | | | |
|---|---|---|---|
| 9,167,510 B2* | 10/2015 | Fu ........................ | H04W 48/16 |
| 9,295,043 B2* | 3/2016 | Papasakellariou .... | H04W 24/08 |
| 9,479,407 B2* | 10/2016 | Kim ........................ | H04L 43/08 |
| 9,622,235 B2* | 4/2017 | Lee ........................ | H04L 5/0053 |
| 10,079,658 B2* | 9/2018 | Chen ........................ | H04L 1/1829 |
| 10,448,423 B2* | 10/2019 | Babaei .................. | H04W 72/23 |
| 10,757,621 B2* | 8/2020 | Park ..................... | H04W 36/304 |
| 11,191,011 B2* | 11/2021 | Tiirola .................. | H04L 5/0053 |
| 11,212,736 B2* | 12/2021 | Xu ........................ | H04W 48/12 |
| 11,395,287 B2* | 7/2022 | Tang ..................... | H04W 72/23 |
| 11,641,594 B2* | 5/2023 | Tiirola .................. | H04L 5/0048 |
| | | | 370/328 |
| 11,711,832 B2* | 7/2023 | Khoshnevisan ........ | H04W 8/24 |
| | | | 370/329 |
| 11,856,594 B2* | 12/2023 | Kim .................. | H04W 72/1263 |
| 2011/0075624 A1* | 3/2011 | Papasakellariou .... | H04W 48/12 |
| | | | 370/329 |
| 2011/0075962 A1* | 3/2011 | Block .................. | G02B 6/1226 |
| | | | 385/12 |
| 2011/0076962 A1 | 3/2011 | Chen et al. | |
| 2013/0064196 A1* | 3/2013 | Gao ..................... | H04L 1/1861 |
| | | | 370/329 |
| 2013/0114529 A1* | 5/2013 | Chen ..................... | H04L 1/1812 |
| | | | 370/329 |
| 2013/0155868 A1 | 6/2013 | Seo et al. | |
| 2014/0133331 A1* | 5/2014 | Fu ........................ | H04L 5/0053 |
| | | | 370/252 |
| 2015/0264667 A1* | 9/2015 | Lee ........................ | H04L 5/001 |
| | | | 370/329 |
| 2018/0279193 A1* | 9/2018 | Park ..................... | H04W 76/27 |
| 2018/0279358 A1* | 9/2018 | Babaei .............. | H04W 72/0453 |
| 2019/0150073 A1* | 5/2019 | Tiirola .................. | H04W 72/56 |
| | | | 455/434 |
| 2019/0313321 A1* | 10/2019 | Xu ........................ | H04L 5/0053 |
| 2019/0342777 A1* | 11/2019 | Tiirola .................. | H04L 5/0091 |
| 2020/0204294 A1 | 6/2020 | Ma et al. | |
| 2020/0245302 A1 | 7/2020 | Pan et al. | |
| 2020/0366533 A1 | 11/2020 | Ji | |
| 2020/0374845 A1* | 11/2020 | Tang ..................... | H04L 5/0053 |
| 2021/0045121 A1* | 2/2021 | Kim ..................... | H04L 5/0094 |
| 2021/0195601 A1* | 6/2021 | Khoshnevisan ...... | H04W 72/53 |

FOREIGN PATENT DOCUMENTS

| | | |
|---|---|---|
| CN | 109391971 A | 2/2019 |
| CN | 109392151 A | 2/2019 |
| CN | 110166191 A | 8/2019 |
| CN | 110351051 A | 10/2019 |
| WO | 2019047719 A1 | 3/2019 |
| WO | 2019154320 A1 | 8/2019 |
| WO | 2020033647 A1 | 2/2020 |

OTHER PUBLICATIONS

International Search Report and Written Opinion for Application No. PCT/CN2021/076777, dated Apr. 27, 2021, 7 Pages.

Intel Corporation, "Considerations on blind decoding for NR PDCCH," 3GPP TSG RAN WG1 Meeting #89, Agenda item 7.1.3.1.2, May 15-19, 2017, R1-1707382, Hangzhou, P.R. China, 5 Pages.

Huawei et al., "UE Procedure of PDCCH Monitoring for URLLC," 3GPP TSG RAN WG1 Meeting #89, Agenda item 7.1.3.1.4, May 15-19, 2017, R1-1708122, Hangzhou, China, 3 Pages.

Second Office Action for Chinese Application No. 202010109200.6, dated Mar. 18, 2023, 15 Pages.

First Office Action for Indian Application No. 202227053228, dated Feb. 28, 2023, 6 Pages.

Extended European Search Report for Application No. 21757709.7-1213, dated Jul. 24, 2023, 10 Pages.

First Office Action for Japanese Application No. 2022-550016, dated Jun. 14, 2023,, 4 Pages.

NTT DOCOMO, Inc. "Offline summary for PDCCH structure and search space part 2" 3GPP TSG RAN WG1 Meeting #94bis, R1-1811926, Chengdu, China, Oct. 2018, 66 Pages.

\* cited by examiner

SS MONITORING METHOD AND DEVICE

CROSS-REFERENCE TO RELATED APPLICATIONS

This application is a continuation application of International Application No. PCT/CN2021/076777 filed on Feb. 19, 2021, which claims priority to Chinese Patent Application No. 202010109200.6, filed on Feb. 21, 2020, which are incorporated herein by reference in their entireties.

TECHNICAL FIELD

Embodiments of the present invention relate to the field of communications technologies, and in particular, to an SS monitoring method and a device.

BACKGROUND

In a new radio technology (NR) system, configuring a plurality of control resource sets (CORESET) and a plurality of search spaces (SS) for user equipment (UE), and flexibly configuring the number of blind detections in each search space are supported, and the maximum number of blind detections and the maximum number of channel estimations in a unit time are specified for the UE.

However, in a carrier aggregation (CA) scenario, a plurality of cells or carriers (CC) may be configured and activated for the UE, but the NR system supports scheduling of one cell by using one piece of DCI. Therefore, when a plurality of cells are to be scheduled, a plurality of pieces of DCI are required. Consequently, in a process of configuring the number of blind detections in a search space, a plurality of UEs are blocked. In a scenario that a secondary cell schedules a primary cell, because a part of DCI for scheduling the primary cell is sent in the secondary cell, PDCCH overheads in the secondary cell increase, and a plurality of UEs may also be blocked.

SUMMARY

Embodiments of the present invention provide an SS monitoring method and a device.

According to a first aspect, an embodiment of the present invention provides an SS monitoring method, applied to UE. The SS monitoring includes: obtaining target information, where the target information includes at least one of the following: configuration information of a first target SS and blind detection resource allocation information of the first target SS, the configuration information is used to indicate the number of blind detections in the first target SS, the blind detection resource allocation information is used to allocate the number of blind detections to an SS in the first target SS, and the number of blind detections includes at least one of the following: the number of downlink control channel candidates and the number of channel estimations; and monitoring a second target SS in the first target SS based on the target information.

According to a second aspect, an embodiment of the present invention provides an SS monitoring method, applied to a network device. The SS monitoring may include: sending target information to UE, where the target information includes at least one of the following: first configuration information of a first target SS and blind detection resource allocation information of the first target SS, the first configuration information is used to indicate the number of blind detections in the first target SS, the blind detection resource allocation information is used to allocate the number of blind detections to an SS in the first target SS, the number of blind detections includes at least one of the following: the number of downlink control channel candidates and the number of channel estimations, and the target information is used by the UE to monitor a second target SS in the first target SS.

According to a third aspect, an embodiment of the present invention provides UE. The UE may include an obtaining module and a monitoring module. The obtaining module is configured to obtain target information, where the target information includes at least one of the following: configuration information of a first target SS and blind detection resource allocation information of the first target SS, the configuration information is used to indicate the number of blind detections in the first target SS, the blind detection resource allocation information is used to allocate the number of blind detections to an SS in the first target SS, and the number of blind detections includes at least one of the following: the number of downlink control channel candidates and the number of channel estimations; and monitor a second target SS in the first target SS based on the target information. The monitoring module is configured to monitor a second target SS in the first target SS based on the target information obtained by the obtaining module.

According to a fourth aspect, an embodiment of the present invention provides a network device. The network device may include a sending module. The sending module is configured to send target information to UE, where the target information includes at least one of the following: first configuration information of a first target SS and blind detection resource allocation information of the first target SS, the first configuration information is used to indicate the number of blind detections in the first target SS, the blind detection resource allocation information is used to allocate the number of blind detections to an SS in the first target SS, the number of blind detections includes at least one of the following: the number of downlink control channel candidates and the number of channel estimations, and the target information is used by the UE to monitor a second target SS in the first target SS.

According to a fifth aspect, an embodiment of the present invention provides UE. The UE includes a processor, a memory, and a computer program stored in the memory and capable of running on the processor, where when the computer program is executed by the processor, the steps of the SS monitoring method in the first aspect are implemented.

According to a sixth aspect, an embodiment of the present invention provides a network device. The network device includes a processor, a memory, and a computer program stored in the memory and capable of running on the processor, where when the computer program is executed by the processor, the steps of the SS monitoring method in the second aspect are implemented.

According to a seventh aspect, an embodiment of the present invention provides a communications system. The communications system includes the UE described in the third aspect and the network device described in the fourth aspect; or the communications system includes the UE described in the fifth aspect and the network device described in the sixth aspect.

According to an eighth aspect, an embodiment of the present invention provides a computer-readable storage medium. The computer-readable storage medium stores a computer program, and when the computer program is executed by a processor, the steps of the SS monitoring method described in the first aspect are implemented, or the steps of the SS monitoring method described in the second aspect are implemented.

In the embodiments of the present invention, the UE may monitor the second target SS in the first target SS based on the obtained target information (the target information includes the configuration information and/or the blind detection resource allocation information of the first target SS, the configuration information is used to indicate the number of blind detections in the first target SS, and the blind detection resource allocation information is used to allocate the number of blind detections to the SS in the first target SS). In a CA scenario or a scenario that a secondary cell schedules a primary cell, the UE may determine, from the first target SS directly based on the configuration information and/or the blind detection resource allocation information, the number of actual blind detections in the SS to be monitored by the UE, and then monitor the SS based on the number of blind detections, instead of determining the number of actual blind detections in the SS to be monitored by the UE and monitoring the SS based on a plurality of pieces of DCI for scheduling or a part of DCI for scheduling the primary cell in the secondary cell. Therefore, blocking of a plurality of UEs in a process of monitoring the SS can be avoided, and a communication capability of the UE can be improved.

DETAILED DESCRIPTION

Figure 1:
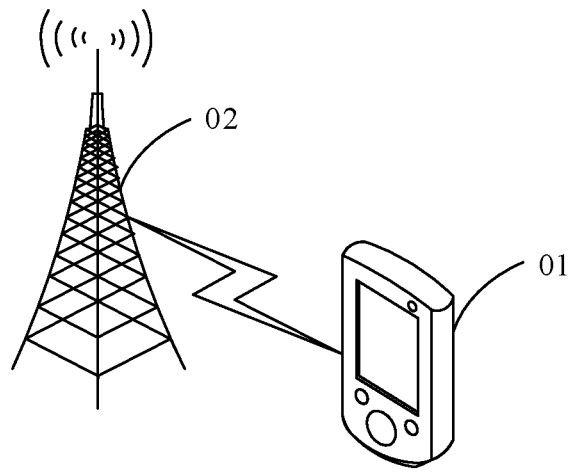
FIG. 1 is a schematic architectural diagram of a communications system according to an embodiment of the present invention.

The following clearly and completely describes the technical solutions in the embodiments of the present invention with reference to the accompanying drawings in the embodiments of the present invention. Apparently, the described embodiments are some but not all of the embodiments of this application. All other embodiments obtained by a person of ordinary skill in the art based on the embodiments of this application without creative efforts shall fall within the protection scope of this application.

In this specification and claims of the embodiments of the present invention, the terms such as "first" and "second" are intended to distinguish between different objects, but not to necessarily describe a specific order of the objects. For example, a first preset cell type, a second preset cell type, and the like are used to distinguish between different preset cell types, but are not intended to describe a specific order of the preset cell types.

In the descriptions of the embodiments of the present invention, "a plurality of" means at least two, unless otherwise specified. For example, a plurality of elements means two elements or more than two elements.

The term "and/or" in this specification describes an association relationship for describing associated objects and represents that three relationships may exist. For example, display panel and/or backlight may represent the following three cases: display panel alone, both display panel and backlight, and backlight alone. The symbol "/" in this specification indicates an "or" relationship between the associated objects, for example, input/output means input or output.

In the embodiments of the present invention, terms such as "an example" or "for example" are used to represent examples, illustrations, or explanations. Any embodiment or design solution described as "an example" or "for example" in the embodiments of the present invention shall not be interpreted to be more preferential or advantageous than other embodiments or design solutions. To be precise, the words such as "an example" or "for example" are intended to present a related concept in a specific manner.

The following describes some concepts and/or terms used in an SS monitoring method and a device provided in the embodiments of the present invention.

1. Blind Detection Restriction:

In a 5GNR system, configuring a plurality of CORESETs and a plurality of search spaces for UE, and flexibly configuring the number of blind detections in each search space are supported, where the CORESETs and the search spaces may be associated flexibly. In addition, the NR system specifies the maximum number of blind detections and the maximum number of channel estimations in a unit time for the UE, that is, a sum of blind detections and a sum of channel estimations in all search spaces cannot exceed the threshold. When the UE is configured in a single-carrier mode or self-scheduling mode in CA, each CC or cell may be configured with a plurality of CORESETs and a plurality of SSs, including a common search space (CSS) and a UE-specific search space (USS). A network device may flexibly configure the number of blind detections for each search space, and the CORESETs and the search spaces may be associated flexibly. The UE may blindly detect a PDCCH based on the configured CORESETs and SSs and by using various radio network temporary identifiers (RNTI), and demodulates downlink control information (DCI) to obtain scheduling information of each cell. Each piece of DCI schedules data of one cell.

In addition, the network device may configure cross-carrier scheduling for the UE, that is, configure a control channel in another cell (for example, a primary cell) with better channel quality, to schedule data of another cell (for example, a secondary cell) across carriers. Subcarrier bandwidths (SCS) in a scheduling cell and a scheduled cell may be the same or different. The scheduling cell may be in a self-scheduling mode, and in this case, the cell schedules only the cell itself. If cross-carrier scheduling is configured for the scheduling cell, the scheduling cell may also schedule one or more scheduled cells other than the scheduling cell itself. The scheduled cell does not have its own physical downlink control channel (PDCCH), and can only be scheduled by the scheduling cell. In the NR system, one cell can be scheduled by only one scheduling cell (that is, can be scheduled only by the cell itself or scheduled by another cell), and the primary cell can be scheduled only by the primary cell. The NR system specifies a maximum processing capability of the UE when the UE blindly detects a PDCCH in one CC or cell. The capability includes two parts: the maximum number of PDCCH candidates to be blindly detected in a slot, and the maximum number of channel estimations required for performing the blind detection by the UE, that is, the number of non-overlapping control channel elements (CCE). A sum of blind detections in all search spaces by the UE and a sum of channel estimations in a unit time cannot exceed the capability threshold. The maximum processing capability of the UE is related to an SCS of a CC or cell to be blindly detected, that is, processing capabilities in a slot vary with different SCSs.

2. Overbooking

When a plurality of search space sets (SS set) are configured, because spaces to be monitored in different SS sets are configured independently, the number of PDCCH candidates or CCEs may be different at different times. Therefore, the network device is allowed to configure the total number of PDCCH candidates or CCEs in each slot beyond a UE capability, and this is referred to as overbooking.

Embodiments of the present invention provide an SS monitoring method and a device. UE may monitor a second target SS in a first target SS based on obtained target information (the target information includes configuration information and/or blind detection resource allocation information of the first target SS, the configuration information is used to indicate the number of blind detections in the first target SS, and the blind detection resource allocation information is used to allocate the number of blind detections to an SS in the first target SS). In a CA scenario or a scenario that a secondary cell schedules a primary cell, the UE may determine, from the first target SS directly based on the configuration information and/or the blind detection resource allocation information, the number of actual blind detections in the SS to be monitored by the UE, and then monitor the SS based on the number of blind detections, instead of determining the number of actual blind detections in the SS to be monitored by the UE and monitoring the SS based on a plurality of pieces of DCI for scheduling or a part of DCI for scheduling the primary cell in the secondary cell. Therefore, blocking of a plurality of UEs in a process of monitoring the SS can be avoided, and a communication capability of the UE can be improved.

The SS monitoring method and device provided in the embodiments of the present invention may be applied to a communications system. Specifically, the method and device may be applied to a process of monitoring an SS corresponding to UE by the UE based on the communications system.

The embodiments of the present invention may be applied to various communications systems, for example, a 5G communications system, a future evolved system, or another communications system. A plurality of application scenarios, for example, machine-to-machine (M2M), D2M, enhanced mobile broadband (eMBB), and ultra-reliable and low latency communications (uRLLC), may be included. This may be specifically determined based on an actual use requirement, and is not limited in the embodiments of the present invention.

For example, FIG. 1 is a schematic architectural diagram of a communications system according to an embodiment of the present invention. As shown in FIG. 1, the communications system may include UE 01 and a network device 02. A connection may be established between the UE 01 and the network device 02 for communication.

The UE is a device that provides a user with voice and/or data connectivity, a handheld device with a wired/wireless connection function, or another processing device connected to a wireless modem. The UE may communicate with one or more core network devices through a radio access network (RAN). The UE may be a mobile terminal such as a mobile phone (or referred to as "cellular" phone) and a computer having a mobile terminal, such as a portable, pocket-sized, handheld, computer built-in, or in-vehicle mobile apparatus, which exchanges voice and/or data with the RAN; or may be a device such as a personal communication service (PCS) phone, a cordless phone, a session initiation protocol (SIP) phone, a wireless local loop (WLL) station, or a personal digital assistant (PDA). The UE may also be referred to as a user agent, a terminal device, or the like. As an example, in this embodiment of the present invention, the UE is shown as a mobile phone in FIG. 1.

The network device may be a base station. The base station is an apparatus deployed in the RAN and configured to provide a wireless communication function for the UE. The base station may include a macro base station, a micro base station, a relay station, an access point, and the like in various forms. In systems using different radio access technologies, devices having base station functions may have different names, for example, a base station (NodeB) in a 3rd generation mobile communications (3G) network, an evolved NodeB (eNB or eNodeB) in a long term evolution (LTE) system, and a gNB in a 5th generation mobile communications (5G) network. With evolution of the communications technologies, the name "base station" may change.

The SS monitoring method and device provided in the embodiments of the present invention are hereinafter described in detail by using specific embodiments and application scenarios thereof with reference to the accompanying drawings.

Figure 2:
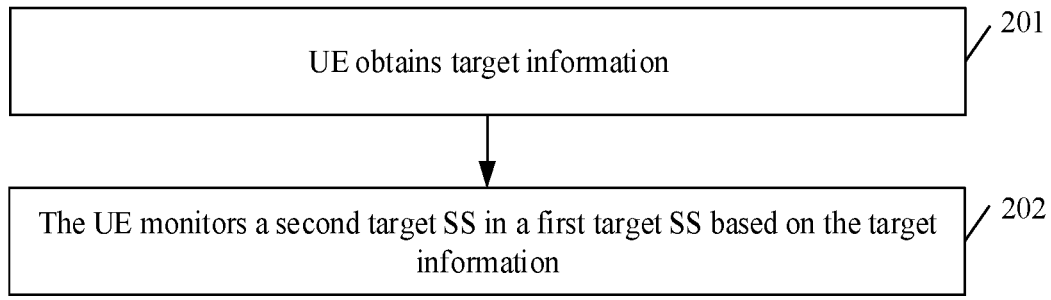
FIG. 2 is a first flowchart of an SS monitoring method according to an embodiment of the present invention.

Based on the communications system shown in FIG. 1, an embodiment of the present invention provides an SS monitoring method, applied to UE. As shown in FIG. 2, the SS monitoring method may include the following step 201 and step 202.

Step 201: UE obtains target information.

In this embodiment of the present invention, the target information includes at least one of the following: configuration information of a first target SS and blind detection resource allocation information of the first target SS, the configuration information is used to indicate the number of blind detections in the first target SS, the blind detection resource allocation information is used to allocate the number of blind detections to an SS in the first target SS, and the number of blind detections includes at least one of the following: the number of downlink control channel candidates and the number of channel estimations.

It should be noted that the configuration information is sent by a network device to the UE; and the blind detection resource allocation information is sent by the network device to the UE (that is, configured by the network device), or prescribed by a protocol, or determined by the UE.

Optionally, in this embodiment of the present invention, the number of downlink control channel candidates may be specifically the number of PDCCH candidates (candidate).

It should be noted that the first target SS may include one or more SSs, and a second target SS may include one or more SSs. It may be understood that the network device may allocate one or more SSs to the UE, and may allocate the number of blind detections to each SS separately, or may allocate the joint number of blind detections to a plurality of SSs. The number of blind detections may be allocated to each aggregation level, or the unified number of blind detections may be allocated to a plurality of aggregation levels.

Optionally, in this embodiment of the present invention, the first target SS includes at least one of the following: an SS for self-scheduling of a primary cell, an SS for scheduling the primary cell by a secondary cell, another SS, an SS for joint scheduling, and an SS for single scheduling.

Optionally, in this embodiment of the present invention, the another SS includes at least one of the following: an SS for self-scheduling of the secondary cell and an SS for scheduling another secondary cell by the secondary cell.

It should be noted that, by using an example that the secondary cell schedules the primary cell, the SS for self-scheduling of the primary cell may be denoted as a P-Self-SS (which may be specifically a P-Self-CSS and/or a P-Self-USS), the SS for scheduling the primary cell or a primary carrier (PCC) of the primary cell by the secondary cell may be denoted as an SP-CR-SS, the another SS of the secondary cell may be denoted as an O-SS (which may include an O-self-SS for self-scheduling of the secondary cell, or an O-otherS-SS for scheduling another secondary cell; the O-self-SS and the O-otherS-SS may be a same SS or may be different SSs; the O-SS may include a CSS, or include only a USS). This embodiment of the present invention is also applied to a case of scheduling a same carrier or different carriers, and the cell and the carrier may be interchanged in the description. The scenario of scheduling the Pcell by the Scell may be generalized as scheduling a cell A by a cell B, and self-scheduling exists in the cell A, that is, the solution of the present invention may also be used if a cell schedules another cell and self-scheduling exists in the another cell.

It should be noted that, by using an example that a cell #0 sends one piece of DCI to schedule two cells #1 and #2 at the same time, this type of DCI that can schedule at least two cells is referred to as joint DCI (for example, the cell A schedules the cell B and a cell C, and the cell A may be the cell B or the cell C, or the cell A may be different from the cell B and the cell C), and an SS in which the DCI is located is referred to as a joint SS. DCI that can schedule only one cell at a time is referred to as single DCI, and an SS in which the DCI is located is referred to as a single SS.

Optionally, in this embodiment of the present invention, the SS for self-scheduling of the primary cell, the SS for scheduling the primary cell from the secondary cell, the SS for self-scheduling of the secondary cell, the SS for scheduling the another secondary cell, the SS for joint scheduling, and the SS for single scheduling may correspond to a same SS. For example, the SS for self-scheduling of the secondary cell may be used to schedule the another secondary cell, and is an SS for joint scheduling.

Optionally, in this embodiment of the present invention, the SS for scheduling the primary cell from the secondary cell and/or the SS for joint scheduling are/is associated with at least one of the following: a preset cell type, the preset number of cells, a preset SCS, a preset period, a preset DCI format, a preset DCI type, a preset aggregation level, a preset time domain length, a preset time domain position, a preset frequency domain position, and a preset identifier.

Optionally, in this embodiment of the present invention, a downlink control channel of the SS for scheduling the primary cell from the secondary cell corresponds to at least one of the following: a first preset cell type, the first preset number of cells, a first preset SCS, a first preset period, a first preset DCI format, a first preset DCI type, a first preset aggregation level, a first preset time domain length, a first preset time domain position, a first preset frequency domain position, and a first preset identifier.

Optionally, in this embodiment of the present invention, a downlink control channel of an SS for scheduling at least two cells corresponds to at least one of the following: a second preset cell type, the second preset number of cells, a second preset SCS, a second preset period, a second preset DCI format, a second preset DCI type, a second preset aggregation level, a second preset time domain length, a second preset time domain position, a second preset frequency domain position, and a second preset identifier.

Optionally, in this embodiment of the present invention, the configuration information includes at least one of the following: the number of blind detections in an SS for self-scheduling of a primary cell, the number of blind detections in an SS for scheduling the primary cell by a secondary cell, the number of blind detections in an SS of the primary cell, the number of blind detections in an SS of the secondary cell, the number of blind detections in an SS for self-scheduling of the secondary cell, the number of blind detections in an SS for scheduling another secondary cell by the secondary cell, the number of blind detections in an SS for scheduling a cell other than the primary cell by the secondary cell, the joint number of blind detections in an SS of the primary cell and an SS of the secondary cell, the number of blind detections in an SS of a scheduling cell, the number of blind detections in an SS for joint scheduling, the number of blind detections in an SS for single scheduling, and the number of blind detections corresponding to a scheduled cell in an SS for joint scheduling.

Optionally, in this embodiment of the present invention, the number of blind detections in the first target SS, indicated by the configuration information, satisfies at least one of the following: the number of blind detections in at least one SS in the first target SS is less than or equal to the maximum number of blind detections of the UE; and the joint number of blind detections in at least two SSs in the first target SS is less than or equal to the maximum joint number of blind detections of the UE.

It should be noted that for at least one SS in the first target SS, the maximum numbers of blind detections corresponding to different SSs may be different. It may be understood that for each SS in the at least one SS, the number of blind detections in an SS is less than or equal to the maximum number of blind detections corresponding to the SS.

Optionally, in this embodiment of the present invention, the blind detection resource allocation information includes at least one of the following: priority information of the first target SS, a weight of the first target SS, and a target excess of the first target SS, where the target excess is an excess number of blind detections in the first target SS relative to the maximum number of blind detections of the UE.

Optionally, in this embodiment of the present invention, the priority information of the first target SS is configured by the network device, or prescribed by a protocol, or determined by the UE.

Optionally, in this embodiment of the present invention, the weight of the first target SS is configured by the network device, or prescribed by a protocol, or determined by the UE.

Optionally, in this embodiment of the present invention, the target excess is configured by the network device, or prescribed by a protocol, or determined by the UE.

Optionally, in this embodiment of the present invention, the weight of the first target SS and/or the target excess are/is determined by at least one of the following: an associated cell type, the number of associated cells, an associated subcarrier spacing SCS, an associated SS type, a time domain resource of an associated SS, a frequency domain resource of an associated SS, an associated SS period, an associated DCI format, the maximum number of blind detections of the UE, a total excess of blind detections, and a parameter configuration.

Step 202: The UE monitors a second target SS in the first target SS based on the target information.

Optionally, in this embodiment of the present invention, at any unit time point, the second target SS is one SS.

It should be noted that the second target SS may change over time, that is, at different time points, second target SSs actually monitored by the UE may be different.

Optionally, in this embodiment of the present invention, the number of blind detections in at least one SS in the second target SS is less than or equal to the maximum number of blind detections of the UE; and/or the joint number of blind detections in at least two SSs in the second target SS is less than or equal to the maximum joint number of blind detections of the UE.

Optionally, in this embodiment of the present invention, the maximum number of blind detections of the UE may include at least one of the following: the maximum number X of blind detections corresponding to self-scheduling of the primary cell of the UE, the maximum number Y of blind detections corresponding to scheduling the primary cell from the secondary cell of the UE, the maximum number P of blind detections supported by the UE in the primary cell, the maximum number S of blind detections supported by the UE in the secondary cell, the maximum number F of blind detections corresponding to self-scheduling of the secondary cell of the UE, the maximum number O of blind detections corresponding to scheduling the another secondary cell by the secondary cell of the UE, the maximum number N of blind detections corresponding to scheduling the cell other than the primary cell by the secondary cell of the UE, and the maximum joint number T of blind detections supported by the UE in the primary cell and the secondary cell, where X, Y, P, S, F, O, and N are all natural numbers.

It may be understood that X, Y, P, S, F, O, and N may be all 0, or positive integers.

It may be understood that when the number of blind detections in the SP-CR-SS is counted as a part of the number of blind detections in the Pcell (or is counted as a share of blind detections in the Pcell, or is counted as a budget of blind detections in the Pcell, blind decoding budget), P is a sum of X and Y; or when the SP-CR-SS is counted as a part of the number of blind detections in the secondary cell (scheduling cell) for scheduling the primary cell (or is counted as a share of blind detections in the secondary cell for scheduling the primary cell, or is counted as a budget of blind detections in the secondary cell for scheduling the primary cell, blind decoding budget), P is X.

Optionally, in this embodiment of the present invention, that the number of blind detections in at least one SS in the first target SS is less than or equal to (that is, does not exceed) the maximum number of blind detections of the UE or that the number of blind detections in at least one SS in the second target SS is less than or equal to the maximum number of blind detections of the UE includes at least one of the following: the number of blind detections in the SS for self-scheduling of the primary cell is less than or equal to X, the number of blind detections in the SS for scheduling the primary cell from the secondary cell is less than or equal to Y, and the number of blind detections in the another SS is less than or equal to S.

It may be understood that counting blind detections in the CR-SS as a part of the share of blind detections in the Pcell is in essence dividing blind detection resources based on the scheduled cell. This may be simpler, and subsequently overbooking may be performed for the Pcell, to reduce a blocking rate of users when the Pcell is scheduled.

Optionally, in this embodiment of the present invention, that the number of blind detections in at least one SS in the first target SS is less than or equal to the maximum number of blind detections of the UE or that the number of blind detections in at least one SS in the second target SS is less than or equal to the maximum number of blind detections of the UE includes at least one of the following: the number of blind detections in the SS for self-scheduling of the primary cell is less than or equal to X, the number of blind detections in the SS for scheduling the primary cell from the secondary cell is less than or equal to Y, and the number of blind detections in the SS for self-scheduling of the primary cell is less than or equal to P.

It may be understood that counting blind detections in the CR-SS as a part of a share of blind detections in the scheduling scell is in essence dividing blind detection resources based on the scheduling cell. This may be more flexible, and subsequently overbooking may be performed for the Scell, to reduce a blocking rate of users in the scheduling cell.

Optionally, in this embodiment of the present invention, that the joint number of blind detections in at least two SSs in the first target SS is less than or equal to the maximum joint number of blind detections of the UE or that the joint number of blind detections in at least two SSs in the second target SS is less than or equal to the maximum joint number of blind detections of the UE includes at least one of the following: the number of blind detections in a third target SS is less than or equal to a first value, the number of blind detections in the third target SS is less than or equal to P, and the number of blind detections in a fourth target SS is less than or equal to S, where the third target SS includes the SS for self-scheduling of the primary cell and the SS for scheduling the primary cell from the secondary cell, the first value is a sum of X and Y, and the fourth target SS includes the SS for scheduling the primary cell from the secondary cell and the another SS.

It may be understood that if the number of blind detections in the third target SS is less than or equal to the first value and the number of blind detections in the third target SS is less than or equal to P, optionally, counting blind detections in the CR-SS as a part of a budget of blind detections in the Pcell is in essence dividing blind detection resources based on the scheduled cell. An advantage of this is simplicity, and subsequently overbooking may be performed for the Pcell, to reduce a blocking rate of users when the Pcell is scheduled.

It may be understood that if the number of blind detections in the fourth target SS is less than or equal to S, optionally, counting blind detections in the CR-SS as a part of a budget of blind detections in the scheduling scell is in essence dividing blind detection resources based on the scheduling cell. An advantage of this is flexibility, and subsequently overbooking may be performed for the Scell, to reduce a blocking rate of users when the scheduling scell is scheduled.

Optionally, in this embodiment of the present invention, the maximum number of blind detections of the UE may include at least one of the following: the maximum number I of blind detections in the scheduling cell of the UE, the maximum number J of blind detections corresponding to joint scheduling of the UE, the maximum number K of blind detections corresponding to single scheduling of the UE, and the maximum number $J_i$ of blind detections corresponding to the scheduled cell in M cells of the UE, where, i=0, 1, . . . , M−1, the M cells are cells in a plurality of cells for joint scheduling, M is a positive integer, and J and $J_i$ are both natural numbers.

It should be noted that, with respect to the maximum number $J_i$ of blind detections corresponding to the scheduled cell in the M cells of the UE, it may be understood that each of the M cells corresponds to one maximum number of blind detections, that is, the M cells correspond to M maximum numbers of blind detections.

Optionally, in this embodiment of the present invention, that the number of blind detections in at least one SS in the first target SS is less than or equal to the maximum number of blind detections of the UE or that the number of blind detections in at least one SS in the second target SS is less than or equal to the maximum number of blind detections of the UE includes at least one of the following: the number of blind detections in the SS for joint scheduling is less than or equal to J, and the number of blind detections corresponding to the scheduled cell in the SS for joint scheduling is less than or equal to $J_i$.

It should be noted that the number of blind detections in the SS may include the number of blind detections corresponding to the cell in the SS (for example, the number of blind detections corresponding to the scheduled cell in the SS for joint scheduling). That the number of blind detections corresponding to the scheduled cell in the SS for joint scheduling is less than or equal to $J_i$ may be understood as "the number of blind detections corresponding to the scheduled cell in the SS for joint scheduling is less than or equal to the maximum number of blind detections corresponding to the scheduled cell".

It may be understood that if the number of blind detections in the SS for joint scheduling is less than or equal to J, SS for joint scheduling as a part of a share of blind detections in the scheduling cell (which may be the Pcell, or may be the Scell) is in essence processing as one cell. This may be simpler, and has relatively low complexity.

It may be understood that if the number of blind detections corresponding to the scheduled cell in the SS for joint scheduling is less than or equal to $J_i$, blind detection resources in the joint SS are in essence counted as a budget of blind detections in one or more scheduled cells. For example, the CC #1 schedules the CC #2 and a CC #3, and equally divides 44 blind detection resources between the CC #2 and the CC #3. In this way, a load balance of each PDCCH for scheduling different cells can be ensured. When M=1, it is equivalent to counting blind detection resources in the joint SS as a share of a cell in the scheduled cell. This may be simpler, and has relatively low complexity.

Optionally, in this embodiment of the present invention, that the joint number of blind detections in at least two SSs in the first target SS is less than or equal to the maximum joint number of blind detections of the UE or that the joint number of blind detections in at least two SSs in the second target SS is less than or equal to the maximum joint number of blind detections of the UE includes at least one of the following: the number of blind detections in a fifth target SS is less than or equal to I, and I is a natural number. The fifth target SS includes the SS for joint scheduling and the SS for single scheduling.

In a specific implementation, the UE may allocate blind detection resources to the Pcell P-Self-SS and the SP-CR-SS. Specifically, the P-Self-SS is mapped in the Pcell, and the SP-CR-SS is mapped in the scheduling Scell. The P-Self-SS may be first mapped, and then the SP-CR-SS is mapped. When the number of mapped blind detections is greater than P, or the number of mapped blind detections is greater than the sum of X and Y, or the number of mapped blind detections in the P-Self-SS is greater than X, or the number of mapped blind detections in the SP-CR-SS is greater than Y due to mapping of an SS, the SS and other remaining SSs that are not mapped yet are not mapped.

In another specific implementation, the UE may allocate blind detection resources to the scheduling Scell O-SS and SP-CR-SS. Specifically, the O-SS and the SP-CR-SS are mapped in the scheduling Scell. The SP-CR-SS may be first mapped, and then the O-SS is mapped. When the number of mapped blind detections is greater than S, or the number of mapped blind detections in the SP-CR-SS is greater than Y due to mapping of an SS, the SS and other remaining SSs that are not mapped yet are not mapped.

Optionally, in this embodiment of the present invention, the maximum number of blind detections of the UE may be prescribed by a protocol, or determined by the UE, or configured by the network device.

It should be noted that the maximum number of blind detections may be understood as a general maximum number limit on other cells (for example, self-scheduling of the secondary cell or scheduling the another secondary cell by the secondary cell) than the primary cell scheduled by the secondary cell. If the maximum number of blind detections of the UE is prescribed by a protocol, or determined by the UE, the maximum number of blind detections of the UE may also be referred to as the maximum number of blind detections supported by the UE.

Figure 3:
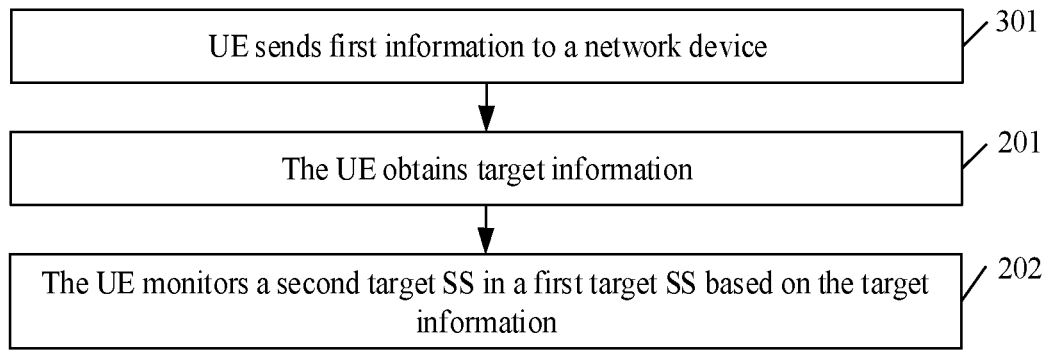
FIG. 3 is a second flowchart of an SS monitoring method according to an embodiment of the present invention.

Optionally, in this embodiment of the present invention, with reference to FIG. 2, as shown in FIG. 3, before the foregoing step 201, the SS monitoring method provided in this embodiment of the present invention may further include the following step 301.

Step 301: The UE sends first information to the network device.

In this embodiment of the present invention, the first information is used to indicate the maximum number of blind detections of the UE.

Optionally, in this embodiment of the present invention, the maximum number of blind detections of the UE, indicated by the first information, may be prescribed by a protocol, or determined by the UE.

It should be noted that, for step 301, an execution sequence may alternatively be that step 201 is first performed, and then step 301 is performed, that is, step 301 follows step 201. This may be specifically determined based on an actual use requirement, and is not limited in this embodiment of the present invention.

Optionally, in this embodiment of the present invention, the UE may map the SS (that is, allocating blind detection resources to the SS, that is, an overbooking process) in the following several implementations, so that the number of blind detections in the SS actually monitored by the UE (that is, the number of blind detections in the second target SS) is less than or equal to the maximum number of blind detections of the UE.

It should be noted that, in a possible implementation, at any unit time point, the UE needs to blindly detect only one search space, or at any unit time point, the UE may need to detect a plurality of search spaces, but a sum of blind detections in all search spaces does not exceed the maximum number (M) of blind detections supported by the UE. In this case, the UE may separately perform blind detections based on the configured number of blind detections.

Figure 4:
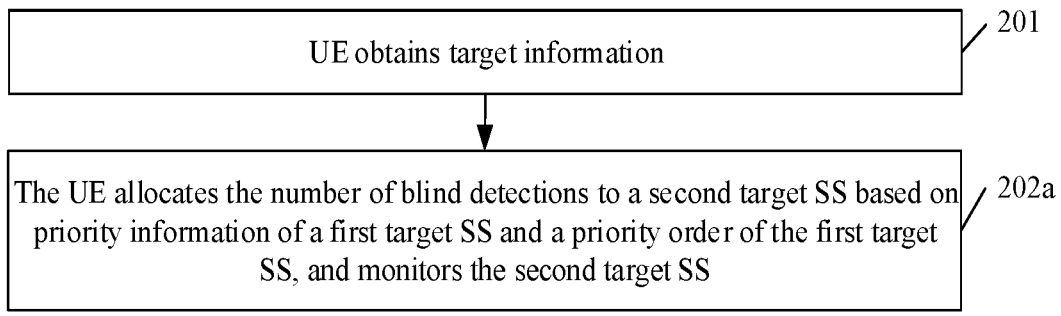
FIG. 4 is a third flowchart of an SS monitoring method according to an embodiment of the present invention.

Optionally, in an implementation of this embodiment of the present invention, with reference to FIG. 2, as shown in FIG. 4, the foregoing step 202 may be specifically implemented by performing the following step 202a.

Step 202a: The UE allocates the number of blind detections to the second target SS based on the priority information of the first target SS and a priority order of the first target SS, and monitors the second target SS.

Optionally, in this embodiment of the present invention, the priority information (which may be understood as a mapping sequence) may include priority information of a type of the first target SS, to indicate a priority of the type of the first target SS.

Optionally, in this embodiment of the present invention, the UE may preferentially allocate blind detection resources to an SS with a high priority (for example, a high-priority type) in the first target SS, and then allocate blind detection resources to an SS of a low-priority type, to ensure the number of blind detections in the SS of the high-priority type, and reduce the number of blind detections in the SS of the low-priority type, so that the number of blind detections in the second target SS does not exceed the maximum number of blind detections of the UE. When the total number of blind detections after an SS is mapped (that is, blind detection resources are allocated to the SS) exceeds the maximum number of blind detections of the UE, the SS and other SSs that are not mapped are not mapped.

Optionally, in this embodiment of the present invention, a priority of the SS for self-scheduling of the primary cell is higher than a priority of the SS for scheduling the primary cell from the secondary cell; and/or a priority of a CSS in the another SS is higher than a priority of a USS in the another SS; and/or a priority of the SS for scheduling the primary cell from the secondary cell is higher than or lower than a priority of the another SS.

Optionally, in this embodiment of the present invention, if the priority of the SS for self-scheduling of the primary cell is higher than the priority of the SS for scheduling the primary cell from the secondary cell, a priority of a CSS in the SS for self-scheduling of the primary cell is higher than a priority of a USS in the SS for self-scheduling of the primary cell, and the priority of the USS in the SS for self-scheduling of the primary cell is higher than the priority of the SS for scheduling the primary cell from the secondary cell; or a priority of a CSS in the SS for self-scheduling of the primary cell is higher than the priority of the SS for scheduling the primary cell from the secondary cell, and the priority of the SS for scheduling the primary cell from the secondary cell is higher than a priority of a USS in the SS for self-scheduling of the primary cell; or a priority of a CSS in the SS for self-scheduling of the primary cell is higher than the priority of the SS for scheduling the primary cell from the secondary cell.

For example, if "the priority of the CSS in the P-Self-SS is higher than the priority of the USS in the P-Self-SS and the priority of the USS in the P-Self-SS is higher than the priority of the SP-CR-SS", for the primary cell, the CSS in the P-Self-SS may be mapped preferentially, then the USS in the P-Self-SS is mapped, and then the SP-CR-SS is mapped. Optionally, the SP-CR-SS is counted as a share of blind detections of the primary cell.

For another example, if "the priority of the CSS in the P-Self-SS is higher than the priority of the SP-CR-SS", for the primary cell, the CSS in the P-Self-SS may be mapped preferentially, and then the SP-CR-SS is mapped. Optionally, the SP-CR-SS is counted as a share of blind detections of the primary cell.

For another example, if "the priority of the SP-CR-SS is higher than the priority of the O-SS", when the SP-CR-SS is counted as a share of blind detections of the secondary cell, for the secondary cell, the SP-CR-SS may be mapped preferentially, and then the O-SS is mapped. Optionally, the SP-CR-SS is counted as a share of blind detections of the secondary cell.

For another example, if "the priority of the SP-CR-SS is lower than the priority of the O-SS", for the secondary cell, the O-SS may be mapped preferentially, and then the SP-CR-SS is mapped, that is, the SS for self-scheduling is ensured preferentially, and then the SS for scheduling the primary cell is ensured. Optionally, the SP-CR-SS is counted as a share of blind detections of the secondary cell.

Optionally, in this embodiment of the present invention, the priority of the SS for scheduling the primary cell from the secondary cell is higher than the priority of the CSS in the another SS, and the priority of the CSS in the another SS is higher than the priority of the USS in the another SS.

Optionally, in this embodiment of the present invention, the priority of the CSS in the another SS is higher than the priority of the SS for scheduling the primary cell from the secondary cell, and the priority of the SS for scheduling the primary cell from the secondary cell is higher than the priority of the USS in the another SS; or the priority of the CSS in the another SS is higher than the priority of the USS in the another SS, and the priority of the USS in the another SS is higher than the priority of the SS for scheduling the primary cell from the secondary cell.

Optionally, in this embodiment of the present invention, the foregoing step 202a may be specifically implemented by performing at least one of the following step 202a1 to step 202a4.

Step 202a1: The UE allocates the number of blind detections to the second target SS based on the priority information of the first target SS and an order of the identifier of the first target SS, and monitors the second target SS.

Optionally, in this embodiment of the present invention, the UE may preferentially allocate the number of blind detections to an SS with a smallest identifier.

Optionally, in this embodiment of the present invention, the priority information may include priority information of an identifier of the first target SS, to indicate a priority of the identifier of the first target SS.

Optionally, in this embodiment of the present invention, when priorities of types of SSs are the same or priorities of types of SSs are undefined, the UE may preferentially perform mapping from the SS with the smallest identifier (ID).

Optionally, in this embodiment of the present invention, a small SS identifier may be allocated to an SS with a high priority.

For example, when the priority of the P-self-SS is higher than the priority of the SP-CR-SS, an SS identifier 4 may be allocated to the P-self-SS, and an SS identifier 5 may be allocated to the SP-CR-SS. In this way, the P-self-SS is mapped preferentially, and then the SP-CR-SS is mapped. Optionally, the SP-CR-SS is counted as a share of blind detections of the primary cell.

For another example, when the priority of the SP-CR-SS is higher than the priority of the O-SS, an SS identifier 4 may be allocated to the SP-CR-SS, and an SS identifier 5 may be allocated to the O-SS. In this way, the SP-CR-SS is mapped preferentially, and then the O-SS is mapped. Optionally, the SP-CR-SS is counted as a share of blind detections of the secondary cell scheduling the primary cell.

Optionally, in this embodiment of the present invention, the UE may also preferentially allocate blind detection resources to an SS with a largest identifier (that is, preferentially perform mapping from the largest SS identifier).

Optionally, in this embodiment of the present invention, a large SS identifier may be allocated to an SS of a high-priority type.

For example, when the SP-CR-SS is counted as a share of blind detections of the primary cell, and the priority of the P-self-SS is higher than the priority of the SP-CR-SS, an SS identifier 6 may be allocated to the P-self-SS, and an SS identifier 5 may be allocated to the SP-CR-SS. In this way, the P-self-SS is mapped preferentially, and then the SP-CR-SS is mapped.

For another example, when the SP-CR-SS is counted as a share of blind detections of the secondary cell, and the priority of the SP-CR-SS is higher than the priority of the O-SS, an SS identifier 6 may be allocated to the SP-CR-SS, and an SS identifier 5 may be allocated to the O-SS. In this way, the SP-CR-SS is mapped preferentially, and then the O-SS is mapped.

Step 202a2: The UE allocates the number of blind detections to the second target SS based on the priority information of the first target SS and an order of identifiers of the cells corresponding to the first target SS, and monitors the second target SS.

Optionally, in this embodiment of the present invention, the UE may preferentially allocate the number of blind detections to an SS corresponding to a smallest cell identifier.

Optionally, in this embodiment of the present invention, the priority information may include priority information of a cell identifier corresponding to the first target SS, to indicate a priority of the cell identifier corresponding to the first target SS.

Optionally, in this embodiment of the present invention, when priorities of types of SSs are the same or priorities of types of SSs are undefined, the UE may preferentially perform mapping from the SS corresponding to the smallest cell identifier (cell ID).

Optionally, in this embodiment of the present invention, if the scheduling cell corresponding to the SS of the high-priority type is the primary cell, a small identifier is allocated to the cell.

For example, when the SP-CR-SS is counted as a share of blind detections of the primary cell, and the priority of the P-self-SS is higher than the priority of the SP-CR-SS, a cell identifier 4 may be allocated to the cell of the P-self-SS, and a cell identifier 5 may be allocated to the cell of the SP-CR-SS. In this way, the P-self-SS is mapped preferentially, and then the SP-CR-SS is mapped.

Optionally, in this embodiment of the present invention, if the scheduled cell corresponding to the SS of the high-priority type is the primary cell, a small identifier is allocated to the cell.

For example, when the SP-CR-SS is counted as a share of blind detections of the scheduling scell, and the priority of the SP-CR-SS is higher than the priority of the O-SS, a cell identifier 4 may be allocated to the cell of the SP-CR-SS, and a cell identifier 5 may be allocated to the cell of the O-SS. In this way, the SP-CR-SS is mapped preferentially, and then the O-SS is mapped.

Optionally, in this embodiment of the present invention, the UE may also preferentially allocate blind detection resources to an SS corresponding to a largest cell identifier (that is, preferentially perform mapping from the SS corresponding to the largest cell identifier).

For example, when the SP-CR-SS is counted as a share of blind detections of the Pcell, and the priority of the P-self-SS is higher than the priority of the SP-CR-SS, a cell identifier 6 may be allocated to the cell of the P-self-SS, and a cell identifier 5 may be allocated to the cell of the SP-CR-SS. In this way, the P-self-SS is mapped preferentially, and then the SP-CR-SS is mapped.

For example, when the SP-CR-SS is counted as a share of blind detections of the scheduled scell, and the priority of the SP-CR-SS is higher than the priority of the O-SS, a cell identifier 6 may be allocated to the cell of the SP-CR-SS, and a cell identifier 5 may be allocated to the cell of the O-SS. In this way, the SP-CR-SS is mapped preferentially, and then the O-SS is mapped.

Optionally, in this embodiment of the present invention, the cell identifier may be a carrier indicator field (CIF), a physical cell identifier (PCI), another identifier corresponding to a cell, or the like.

Step 202a3: The UE preferentially allocates the number of blind detections to the second target SS associated with a preset downlink control information DCI format or a preset DCI type, and monitors the second target SS.

Optionally, in this embodiment of the present invention, a priority of an SS of DCI for self-scheduling is higher than or lower than a priority of an SS of DCI for cross-carrier scheduling. Alternatively, a priority of an SS of DCI for scheduling Q1 (Q1 is a positive integer greater than 1) cells is higher than or lower than a priority of an SS of DCI for scheduling Q2 (Q2 is an integer less than Q1, for example, Q2=1) cells. Alternatively, a priority of an SS of DCI including a CIF field is higher than or lower than a priority of an SS of DCI not including a CIF field. Alternatively, a priority of an SS associated with the primary cell and corresponding to DCI with a CIF field is higher than or lower than a priority of an SS of other DCI.

Step 202a4: The UE preferentially allocates the number of blind detections to the second target SS associated with a preset cell, and monitors the second target SS.

Optionally, in this embodiment of the present invention, the priority of the SS associated with the primary cell is higher than or lower than a priority of an SS associated with another cell. Alternatively, a priority of an SS associated with the scheduling cell is higher than or lower than a priority of an SS associated with another cell. Alternatively, a priority of an SS associated with Q3 (Q3 is a positive integer greater than 1) cells is higher than or lower than a priority of an SS associated with Q4 (Q4 is an integer less than Q3, for example, Q4=1) cells.

Figure 5:
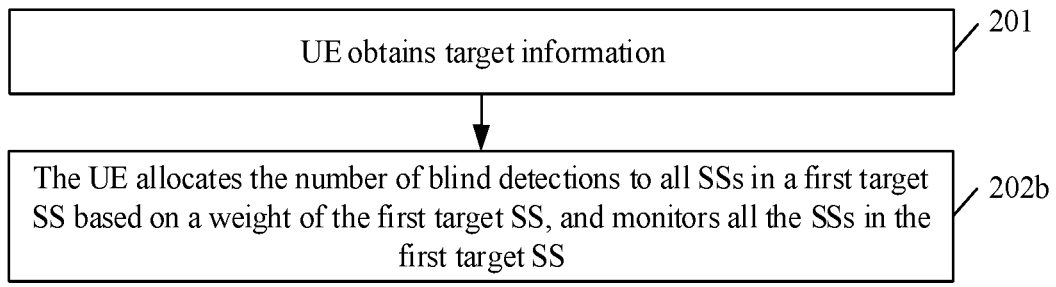
FIG. 5 is a fourth flowchart of an SS monitoring method according to an embodiment of the present invention.

Optionally, in another implementation of this embodiment of the present invention, with reference to FIG. 2, as shown in FIG. 5, the foregoing step 202 may be specifically implemented by performing the following step 202b.

Step 202b: The UE allocates the number of blind detections to all SSs in the first target SS based on the weight of the first target SS, and monitors all the SSs in the first target SS.

It may be understood that in this manner, the second target SS is all SSs in the first target SS.

Optionally, in this embodiment of the present invention, a sum of the weighted number of blind detections in the SS for self-scheduling of the primary cell and the weighted number of blind detections in the SS for scheduling the primary cell from the secondary cell is less than or equal to P; and/or a sum of the weighted number of blind detections in the SS for scheduling the primary cell from the secondary cell and the weighted number of blind detections in the SS in the another SS is less than or equal to S.

Optionally, in this embodiment of the present invention, a sum of the weighted number of blind detections in the SS for joint scheduling of the scheduling cell and the weighted number of blind detections in the SS for single scheduling of the scheduling cell is less than or equal to the maximum number I of blind detections in the scheduling cell of the UE.

It may be understood that mapping all SSs based on the weight (for example, a proportion of the total number of blind detections) can ensure that the total number of blind detections does not exceed the maximum joint number of blind detections of the UE.

Optionally, in this embodiment of the present invention, a sum of the number of blind detections in at least one P-Self-SS (N1*P-Self-SS) and the number of blind detections in at least one SP-CR-SS (N2*SP-CR-SS) is less than or equal to P (N1*P-Self-SS+N2*SP-CR-SS≤P), and/or a sum of the number of blind detections in at least one SP-CR-SS (N3*SP-CR-SS) and the number of blind detections in at least one O-SS is less than or equal to S (N3*SP-CR-SS+N4*O-SS≤S). A sum of the number of blind detections in a joint SS of at least one scheduling cell (joint SS of Nj* scheduling cell) and the number of blind detections in a single SS of at least one scheduling cell (single SS of Nk* scheduling cell) is less than or equal to I of the scheduling cell (joint SS of Nj* scheduling cell+single SS of Nk* scheduling cell≤I of the scheduling cell). N1, N2, N3, N4, Nj, and Nk are corresponding weights.

It should be noted that a plurality of P-Self-SSs, SP-CR-SSs, O-SSs, joint SSs, and single SSs may exist herein. Therefore, actually there is a process of accumulation and summation. In addition, the number of P-Self-SSs and the number of SP-CR-SSs may be the same or different, the number of SP-CR-SSs and the number of O-SSs may be the same or different, and the number of joint SSs and the number of single SSs may be the same or different. When there are a plurality of P-Self-SSs, weights corresponding to the P-Self-SSs may be the same or different. When there are a plurality of SP-CR-SSs, weights corresponding to the SP-CR-SSs may be the same or different. When there are a plurality of O-SSs, weights corresponding to the O-SSs may be the same or different. When there are a plurality of joint SSs, weights corresponding to the joint SSs may be the same or different. When there are a plurality of single SSs, weights corresponding to the single SSs may be the same or different.

Optionally, in this embodiment of the present invention, assuming that an SS $S_i$ may be used to send joint DCI that can schedule $T_i$ cells, and the allocated number of blind detections is $B_i$, and a calculated weight allocated to $S_i$ is $$n_i = \frac{T_i}{\sum_i T_i},$$

the number of actual blind detections in $S_i$ is $B_i'=M_{max} \times n_i$.

For example, assuming that the maximum number M of blind detections of the UE is equal to 44, three SSs (for example, S1, S2, and S3) are configured for the UE, where S1 may be used to send DCI that can schedule two cells, S2 is a single SS, S3 is a single SS, and the number of blind detections in each SS is configured as 20. When the three SSs overlap in time, the number of actual blind detections in each SS is calculated: Allocated weights are n1=½, n2=¼, and n3=¼ respectively. The number of blind detections actually allocated to each SS is $B_1'$=22, $B_2'$=11, and $B_3'$=11. Based on the allocation mode in this embodiment of the present invention, the total number of blind detections does not exceed an upper limit of 44, and more blind detections are maintained in an SS for scheduling a plurality of cells.

Optionally, in this embodiment of the present invention, assuming that an SS $S_i$ may be used to send joint DCI that can schedule $T_i$ cells, and a period of the SS is $P_i$, and the allocated number of blind detections is $B_i$, and a calculated weight allocated to $S_i$ is $$n_i = \frac{P_i}{\sum_i P_i},$$

the number of actual blind detections in $S_i$ is $B_i'=M_{max} \times n_i$.

For example, assuming that the maximum number M of blind detections of the UE is equal to 44, three SSs (for example, S1, S2, and S3) are configured for the UE, where S1 may be used to send DCI that can schedule two cells, S2 is a single SS, S3 is a single SS, the number of blind detections in each SS is configured as 20, and periods of S1, S2, and S3 are 20 ms, 10 ms, and 10 ms respectively. When the three SSs overlap in time, the number of actual blind detections in each SS is calculated: Allocated weights are n1=½, n2=¼, and n3=¼ respectively. The number of blind detections actually allocated to each SS is $B_1'$=22' $B_2'$=11, and $B_3'$=11. Based on the allocation mode in this embodiment of the present invention, the total number of blind detections does not exceed an upper limit of 44, and more blind detections are maintained in an SS for scheduling a plurality of cells. In addition, more blind detections are maintained in a long-period SS, but fewer blind detections are maintained in a short-period SS. This ensures fairness, and ensures that there is no case that the number of blind detections cannot be allocated to the long-period SS for a long time.

Figure 6:
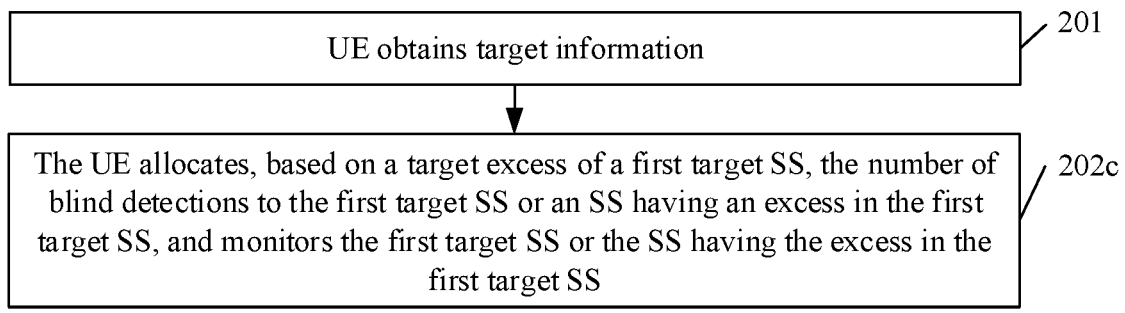
FIG. 6 is a fifth flowchart of an SS monitoring method according to an embodiment of the present invention.

Optionally, in still another implementation of this embodiment of the present invention, with reference to FIG. 2, as shown in FIG. 6, the foregoing step 202 may be specifically implemented by performing the following step 202c.

Step 202c: The UE allocates, based on the target excess of the first target SS, the number of blind detections to the first target SS or an SS having an excess in the first target SS, and monitors the first target SS or the SS having the excess in the first target SS.

It may be understood that in this manner, the second target SS is the first target SS or the SS having the excess in the first target SS.

Optionally, in this embodiment of the present invention, the number of blind detections corresponding to the SS for scheduling the primary cell from the secondary cell is a difference between the number of blind detections configured for the SS for scheduling the primary cell from the secondary cell and a total excess of blind detections corresponding to the SS for scheduling the primary cell from the secondary cell; and/or the number of blind detections in an SS for self-scheduling of the primary cell is a difference between the number of blind detections configured for the SS for self-scheduling of the primary cell and a total excess of blind detections corresponding to the SS for self-scheduling of the primary cell; and/or the number of blind detections in the joint SS is a difference between the number of blind detections configured for the joint SS and a total excess of blind detections corresponding to the joint SS.

Optionally, in this embodiment of the present invention, the UE may determine, based on a configuration of the network device (that is, the foregoing configuration information), that the number of blind detections includes M more blind detection resources than the maximum number of blind detections of the UE, that is, a target excess (a total excess of blind detections, that is, an excess of the sum of blind detections in all the SSs in comparison with the maximum number of blind detections of the UE) is M; and the UE may subtract the corresponding excess when mapping an SS.

Optionally, in this embodiment of the present invention, during mapping of each SS, the UE may perform mapping based on the number of blind detections after the corresponding excess is subtracted, to ensure that the total number of blind detections does not exceed the maximum number of blind detections of the UE.

Optionally, in this embodiment of the present invention, the UE may first calculate the total excess of blind detections, then determine, based on one or more configuration parameters (for example, the period, the number of blind detections, priority information, a DCI format, a DCI size, an SS type, and/or the number of channel estimations), weights allocated to different SSs, then allocate different excesses to the SSs based on the weights, and finally subtract the excess from each SS, so that a sum of actual blind detections does not exceed the maximum number of blind detections of the UE.

It should be noted that if the number of blind detections in an SS is less than an excess corresponding to the SS, the number of blind detections in the SS may be reduced to C (C is an integer), and C plus a difference between the excess and the number of blind detections is an overdraft, and the overdraft is reallocated to another SS based on an allocated weight.

Optionally, in this embodiment of the present invention, a weight corresponding to the excess of blind detections is related to the number of scheduled cells (that is, more blind detections are allocated to a search space in which DCI scheduling more cells is located, or more blind detections are allocated to a search space in which DCI associated with more cells is located).

Optionally, in this embodiment of the present invention, assuming that an SS $S_i$ may be used to send DCI that can schedule $T_i$ cells, and the allocated number of blind detections is $B_i$, a calculated weight allocated to $S_i$ is $$n_i = \frac{T_i}{\sum_i T_i},$$

and a calculated excess of blind detections is $M = \Sigma_i B_i - M_{max}$, and a proportion of the excess in $S_i$ is $D_i = \text{Round\_up}(M \times n_i)$, the number of actual blind detections in $S_i$ is $B_i' = B_i - D_i$.

For example, assuming that the maximum number M of blind detections of the UE is equal to 44, three SSs (for example, S1, S2, and S3) are configured for the UE, where S1 may be used to send DCI that can schedule two cells, S2 is a single SS, S3 is a single SS, and the number of blind detections in each SS is configured as 20. When the three SSs overlap in time, the number of actual blind detections in each SS is calculated: An excess is M=60−44=16, allocated weights are n1=½, n2=¼, and n3=¼ respectively, excess proportions are D1=8, D2=4, and D3=4 respectively, and the number of actual blind detections allocated to each SS is $B_1'=12$, $B_2'=16$, and $B_3'=16$. The total number of blind detections does not exceed the upper limit of 44 according to the allocation mode in this embodiment of the present invention.

It should be noted that the UE may determine the number of blind detections in the second target SS by performing at least one of the foregoing step 202a, step 202b, and step 202c. This may be specifically determined based on an actual use requirement, and is not limited in this embodiment of the present invention.

It may be understood that in this embodiment of the present invention, the configuration (that is, the configuration information) of the network device may be used to ensure that the number of actual blind detections in an SS monitored by the UE is less than or equal to the maximum number of blind detections of the UE, or an overbooking process performed by the UE ensures that the number of actual blind detections in an SS monitored by the UE is less than or equal to the maximum number of blind detections of the UE.

In this embodiment of the present invention, the UE may support scheduling of a cell by another cell during self-scheduling of the cell, for example, monitor DCI for scheduling the primary cell by the primary cell and the secondary cell, allocate the maximum number of PDCCH candidates of blind detections of the UE, the maximum number of non-overlapping CCEs, the DCI size budget, and the like between the two scheduling cells, so that the network device maximally uses a blind detection capability of the UE, to avoid blocking of a plurality of UEs.

An embodiment of the present invention provides an SS monitoring method. UE may monitor a second target SS in a first target SS based on obtained target information (the target information includes configuration information and/or blind detection resource allocation information of the first target SS, the configuration information is used to indicate the number of blind detections in the first target SS, and the blind detection resource allocation information is used to allocate the number of blind detections to an SS in the first target SS). In a CA scenario or a scenario that a secondary cell schedules a primary cell, the UE may determine, from the first target SS directly based on the configuration information and/or the blind detection resource allocation information, the number of actual blind detections in the SS to be monitored by the UE, and then monitor the SS based on the number of blind detections, instead of determining the number of actual blind detections in the SS to be monitored by the UE and monitoring the SS based on a plurality of pieces of DCI for scheduling or a part of DCI for scheduling the primary cell in the secondary cell. Therefore, blocking of a plurality of UEs in a process of monitoring the SS can be avoided, and a communication capability of the UE can be improved.

Figure 7:
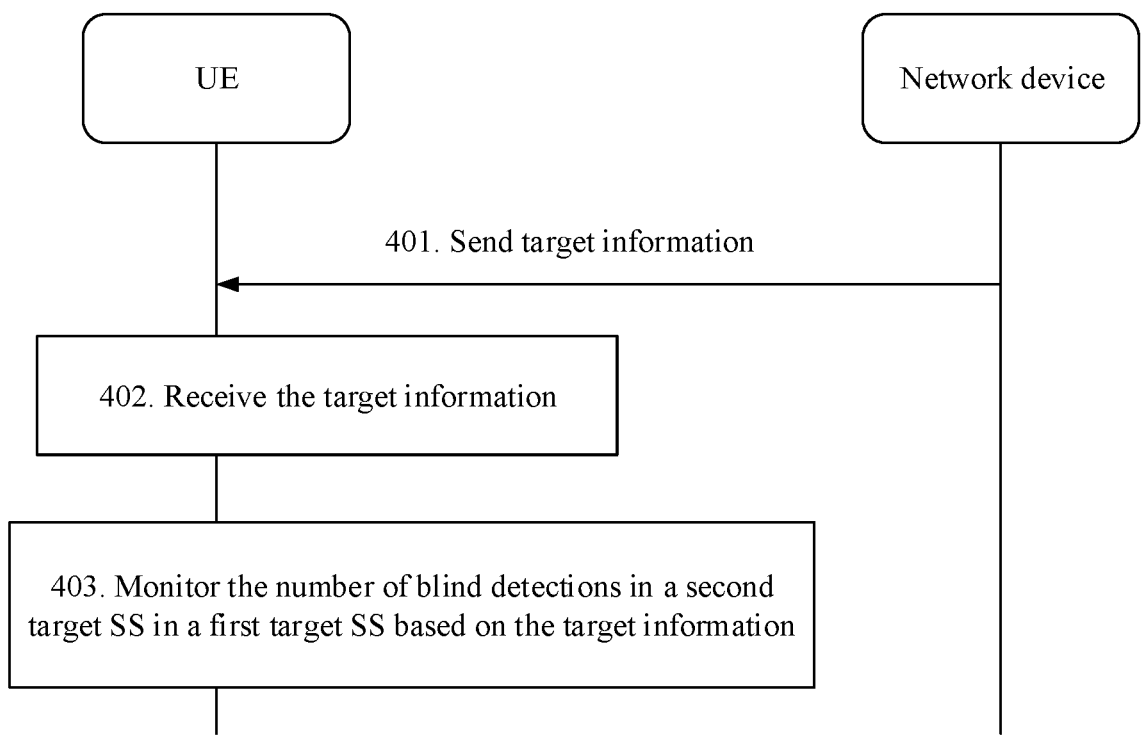
FIG. 7 is a sixth flowchart of an SS monitoring method according to an embodiment of the present invention.

Based on the communications system shown in FIG. 1, an embodiment of the present invention provides an SS monitoring method, applied to an interaction process between UE and a network device. As shown in FIG. 7, the SS monitoring method may include the following step 401 to step 403.

Step 401: A network device sends target information to UE.

In this embodiment of the present invention, the target information includes at least one of the following: first configuration information of a first target SS and blind detection resource allocation information of the first target SS, the first configuration information is used to indicate the number of blind detections in the first target SS, the blind detection resource allocation information is used to allocate the number of blind detections to an SS in the first target SS, the number of blind detections includes at least one of the following: the number of downlink control channel candidates and the number of channel estimations, and the target information is used by the UE to monitor a second target SS in the first target SS.

It should be noted that the first configuration information corresponds to the configuration information in the foregoing embodiment.

Step 402: The UE receives the target information sent by the network device.

Step 403: The UE monitors the number of blind detections in the second target SS in the first target SS based on the target information.

It should be noted that for the detailed description of content in the foregoing step 401 to step 403, refer to the description in the foregoing embodiment. Details are not described herein again.

In the SS monitoring method provided in this embodiment of the present invention, the network device may send the target information to the UE, so that in a CA scenario or a scenario that a secondary cell schedules a primary cell, the UE may determine, from the first target SS directly based on the configuration information and/or the blind detection resource allocation information, the number of actual blind detections in the SS to be monitored by the UE, and then monitor the SS based on the number of blind detections, instead of determining the number of actual blind detections in the SS to be monitored by the UE and monitoring the SS based on a plurality of pieces of DCI for scheduling or a part of DCI for scheduling the primary cell in the secondary cell. Therefore, blocking of a plurality of UEs in a process of monitoring the SS can be avoided, and a communication capability of the UE can be improved.

Figure 8:
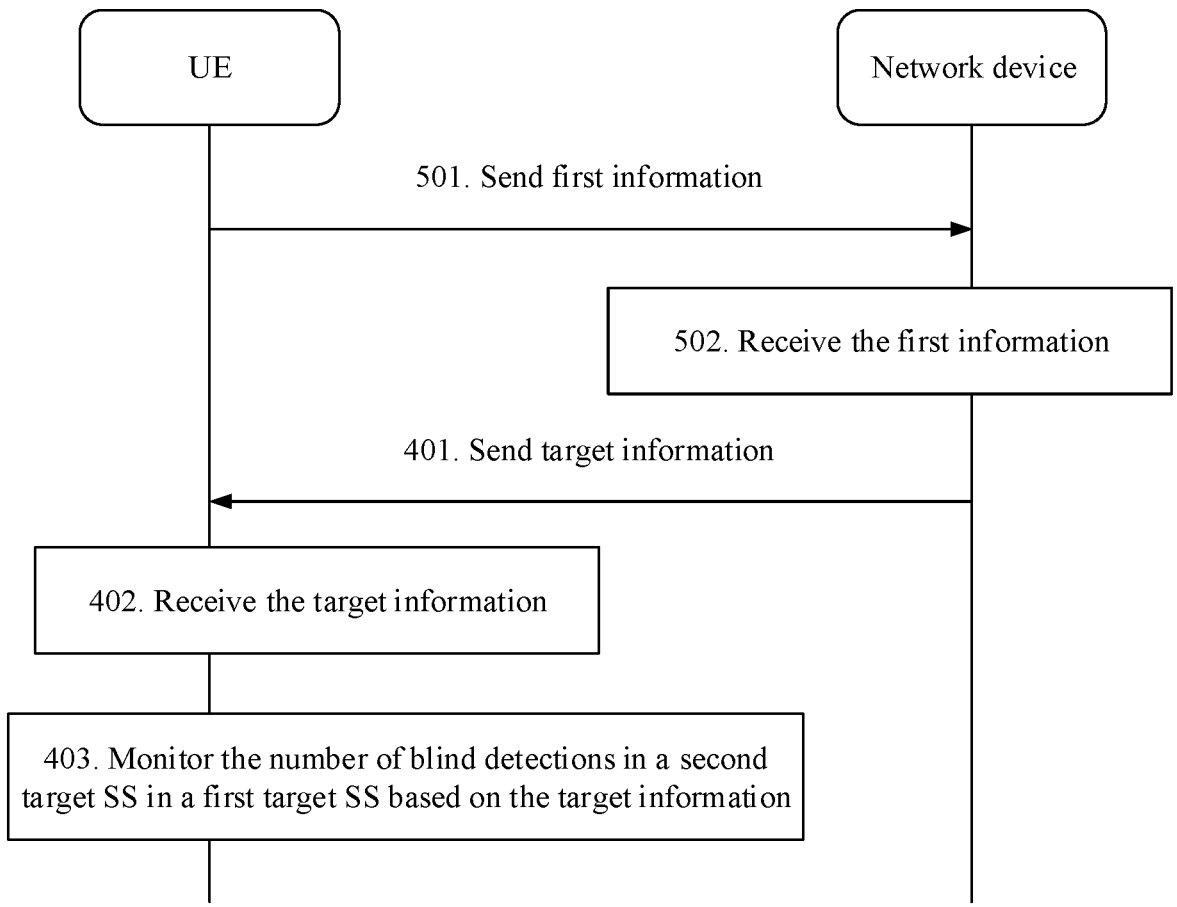
FIG. 8 is a seventh flowchart of an SS monitoring method according to an embodiment of the present invention.

Optionally, in this embodiment of the present invention, with reference to FIG. 7, as shown in FIG. 8, before the foregoing step 401, the SS monitoring method provided in this embodiment of the present invention may further include the following step 501 and step 502.

Step 501: The UE sends first information to the network device.

Step 502: The network device receives the first information sent by the UE.

It should be noted that for the detailed description of content in the foregoing step 501 and step 502, refer to the description in the foregoing embodiment. Details are not described herein again. In addition, for step 501 and step 502, an execution sequence may alternatively be that step 401 and step 402 are first performed, and then step 501 and step 502 are performed, that is, step 501 and step 502 follow step 402. This may be specifically determined based on an actual use requirement, and is not limited in this embodiment of the present invention.

Optionally, in this embodiment of the present invention, before the foregoing step 401, the SS monitoring method provided in this embodiment of the present invention may further include the following step 601 and step 602.

Step 601: The network device sends second configuration information to the UE.

In this embodiment of the present invention, the second configuration information is used to configure the maximum number of blind detections for the UE.

Step 602: The UE receives the second configuration information sent by the network device.

It should be noted that for the detailed description of content in the foregoing step 601 and step 602, refer to the description in the foregoing embodiment. Details are not described herein again. In addition, for step 601 and step 602, an execution sequence may alternatively be that step 401 and step 402 are first performed, and then step 601 and step 602 are performed, that is, step 601 and step 602 follow step 402. This may be specifically determined based on an actual use requirement, and is not limited in this embodiment of the present invention.

Figure 9:
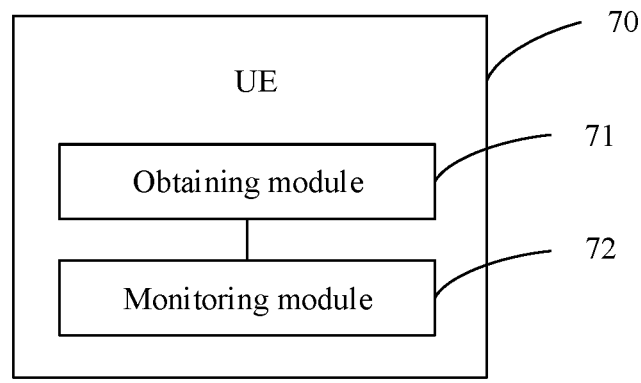
FIG. 9 is a first schematic structural diagram of UE according to an embodiment of the present invention.

FIG. 9 is a possible schematic structural diagram of UE in an embodiment of the present invention. As shown in FIG. 9, UE 70 provided in this embodiment of the present invention may include an obtaining module 71 and a monitoring module 72.

The obtaining module 71 is configured to obtain target information. The target information includes at least one of the following: configuration information of a first target SS and blind detection resource allocation information of the first target SS, the configuration information is used to indicate the number of blind detections in the first target SS, the blind detection resource allocation information is used to allocate the number of blind detections to an SS in the first target SS, and the number of blind detections includes at least one of the following: the number of downlink control channel candidates and the number of channel estimations. The monitoring module 72 is configured to monitor a second target SS in the first target SS based on the target information obtained by the obtaining module 71.

In a possible implementation, the first target SS includes at least one of the following: an SS for self-scheduling of a primary cell, an SS for scheduling the primary cell by a secondary cell, another SS, an SS for joint scheduling, and an SS for single scheduling, where the another SS includes at least one of the following: an SS for self-scheduling of the secondary cell and an SS for scheduling another secondary cell by the secondary cell.

In a possible implementation, the configuration information includes at least one of the following: the number of blind detections in an SS for self-scheduling of a primary cell, the number of blind detections in an SS for scheduling the primary cell by a secondary cell, the number of blind detections in an SS of the primary cell, the number of blind detections in an SS of the secondary cell, the number of blind detections in an SS for self-scheduling of the secondary cell, the number of blind detections in an SS for scheduling another secondary cell by the secondary cell, the number of blind detections in an SS for scheduling a cell other than the primary cell by the secondary cell, the joint number of blind detections in an SS of the primary cell and an SS of the secondary cell, the number of blind detections in an SS of a scheduling cell, the number of blind detections in an SS for joint scheduling, the number of blind detections in an SS for single scheduling, and the number of blind detections corresponding to a scheduled cell in an SS for joint scheduling.

In a possible implementation, the number of blind detections in the first target SS, indicated by the configuration information, satisfies at least one of the following: the number of blind detections in at least one SS in the first target SS is less than or equal to the maximum number of blind detections of the UE; and the joint number of blind detections in at least two SSs in the first target SS is less than or equal to the maximum joint number of blind detections of the UE.

In a possible implementation, the number of blind detections in at least one SS in the second target SS is less than or equal to the maximum number of blind detections of the UE; and/or the joint number of blind detections in at least two SSs in the second target SS is less than or equal to the maximum joint number of blind detections of the UE.

In a possible implementation, at any unit time point, the second target SS is one SS.

In a possible implementation, the maximum number of blind detections of the UE includes at least one of the following: the maximum number X of blind detections corresponding to self-scheduling of the primary cell of the UE, the maximum number Y of blind detections corresponding to scheduling the primary cell from the secondary cell of the UE, the maximum number P of blind detections supported by the UE in the primary cell, the maximum number S of blind detections supported by the UE in the secondary cell, the maximum number F of blind detections corresponding to self-scheduling of the secondary cell of the UE, the maximum number O of blind detections corresponding to scheduling the another secondary cell by the secondary cell of the UE, the maximum number N of blind detections corresponding to scheduling the cell other than the primary cell by the secondary cell of the UE, and the maximum joint number T of blind detections supported by the UE in the primary cell and the secondary cell, where X, Y, P, S, F, O, and N are all natural numbers.

In a possible implementation, that the number of blind detections in at least one SS in the first target SS is less than or equal to the maximum number of blind detections of the UE or that the number of blind detections in at least one SS in the second target SS is less than or equal to the maximum number of blind detections of the UE includes at least one of the following: the number of blind detections in the SS for self-scheduling of the primary cell is less than or equal to X, the number of blind detections in the SS for scheduling the primary cell from the secondary cell is less than or equal to Y, and the number of blind detections in the another SS is less than or equal to S.

In a possible implementation, that the number of blind detections in at least one SS in the first target SS is less than or equal to the maximum number of blind detections of the UE or that the number of blind detections in at least one SS in the second target SS is less than or equal to the maximum number of blind detections of the UE includes at least one of the following: the number of blind detections in the SS for self-scheduling of the primary cell is less than or equal to X, the number of blind detections in the SS for scheduling the primary cell from the secondary cell is less than or equal to Y, and the number of blind detections in the SS for self-scheduling of the primary cell is less than or equal to P.

In a possible implementation, that the joint number of blind detections in at least two SSs in the first target SS is less than or equal to the maximum joint number of blind detections of the UE or that the joint number of blind detections in at least two SSs in the second target SS is less than or equal to the maximum joint number of blind detections of the UE includes at least one of the following: the number of blind detections in a third target SS is less than or equal to a first value, the number of blind detections in the third target SS is less than or equal to P, and the number of blind detections in a fourth target SS is less than or equal to S, where the third target SS includes the SS for self-scheduling of the primary cell and the SS for scheduling the primary cell from the secondary cell, the first value is a sum of X and Y, and the fourth target SS includes the SS for scheduling the primary cell from the secondary cell and the another SS.

In a possible implementation, the maximum number of blind detections of the UE includes at least one of the following: the maximum number I of blind detections in the scheduling cell of the UE, the maximum number J of blind detections corresponding to joint scheduling of the UE, the maximum number K of blind detections corresponding to single scheduling of the UE, and the maximum number $J_i$ of blind detections corresponding to the scheduled cell in M cells of the UE, where, i=0, 1, . . . , M−1, the M cells are cells in a plurality of cells for joint scheduling, M is a positive integer, and J and $J_i$ are both natural numbers.

In a possible implementation, that the number of blind detections in at least one SS in the first target SS is less than or equal to the maximum number of blind detections of the UE or that the number of blind detections in at least one SS in the second target SS is less than or equal to the maximum number of blind detections of the UE includes at least one of the following: the number of blind detections in the SS for joint scheduling is less than or equal to J, and the number of blind detections corresponding to the scheduled cell in the SS for joint scheduling is less than or equal to $J_i$.

In a possible implementation, that the joint number of blind detections in at least two SSs in the first target SS is less than or equal to the maximum joint number of blind detections of the UE or that the joint number of blind detections in at least two SSs in the second target SS is less than or equal to the maximum joint number of blind detections of the UE includes: the number of blind detections in a fifth target SS is less than or equal to I, and I is a natural number. The fifth target SS includes the SS for joint scheduling and the SS for single scheduling.

Figure 10:
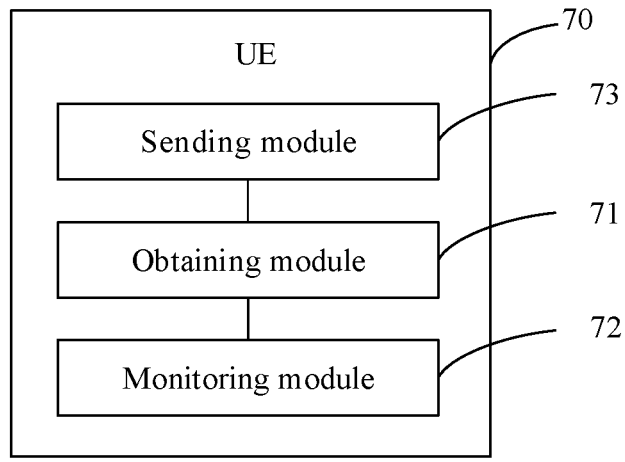
FIG. 10 is a second schematic structural diagram of UE according to an embodiment of the present invention.

In a possible implementation, with reference to FIG. 9, as shown in FIG. 10, the UE 70 provided in this embodiment of the present invention may further include a sending module 73. The sending module 73 sends first information to a network device, where the first information is used to indicate the maximum number of blind detections of the UE.

In a possible implementation, the maximum number of blind detections of the UE is prescribed by a protocol, or determined by the UE, or configured by a network device.

In a possible implementation, the blind detection resource allocation information includes at least one of the following: priority information of the first target SS, a weight of the first target SS, and a target excess of the first target SS, where the target excess is an excess number of blind detections in the first target SS relative to the maximum number of blind detections of the UE.

In a possible implementation, the monitoring module 72 is specifically configured to allocate the number of blind detections to the second target SS based on the priority information of the first target SS and a priority order of the first target SS, and monitor the second target SS.

In a possible implementation, a priority of an SS for self-scheduling of a primary cell is higher than a priority of an SS for scheduling the primary cell by a secondary cell; and/or a priority of a CSS in another SS is higher than a priority of a USS in the another SS; and/or a priority of the SS for scheduling the primary cell from the secondary cell is higher than or lower than a priority of the another SS.

In a possible implementation, a priority of a CSS in the SS for self-scheduling of the primary cell is higher than a priority of a USS in the SS for self-scheduling of the primary cell, and the priority of the USS in the SS for self-scheduling of the primary cell is higher than the priority of the SS for scheduling the primary cell from the secondary cell; or a priority of a CSS in the SS for self-scheduling of the primary cell is higher than the priority of the SS for scheduling the primary cell from the secondary cell, and the priority of the SS for scheduling the primary cell from the secondary cell is higher than a priority of a USS in the SS for self-scheduling of the primary cell; or a priority of a CSS in the SS for self-scheduling of the primary cell is higher than the priority of the SS for scheduling the primary cell from the secondary cell.

In a possible implementation, the priority of the SS for scheduling the primary cell from the secondary cell is higher than the priority of the CSS in the another SS, and the priority of the CSS in the another SS is higher than the priority of the USS in the another SS.

In a possible implementation, the priority of the CSS in the another SS is higher than the priority of the SS for scheduling the primary cell from the secondary cell, and the priority of the SS for scheduling the primary cell from the secondary cell is higher than the priority of the USS in the another SS; or the priority of the CSS in the another SS is higher than the priority of the USS in the another SS, and the priority of the USS in the another SS is higher than the priority of the SS for scheduling the primary cell from the secondary cell.

In a possible implementation, the monitoring module 72 is specifically configured to: allocate the number of blind detections to the second target SS based on the priority information of the first target SS and an order of the identifier of the first target SS, and monitor the second target SS; and/or allocate the number of blind detections to the second target SS based on the priority information of the first target SS and an order of identifiers of the cells corresponding to the first target SS, and monitor the second target SS; and/or preferentially allocate the number of blind detections to the second target SS associated with a preset downlink control information DCI format or a preset DCI type, and monitor the second target SS; and/or preferentially allocate the number of blind detections to the second target SS associated with a preset cell, and monitor the second target SS.

In a possible implementation, the monitoring module 72 is specifically configured to allocate the number of blind detections to all SSs in the first target SS based on the weight of the first target SS, and monitor all the SSs in the first target SS.

In a possible implementation, a sum of the weighted number of blind detections in an SS for self-scheduling of a primary cell and the weighted number of blind detections in an SS for scheduling the primary cell by a secondary cell is less than or equal to P; and/or a sum of the weighted number of blind detections in the SS for scheduling the primary cell from the secondary cell and the weighted number of blind detections in an SS in another SS is less than or equal to S.

In a possible implementation, a sum of the weighted number of blind detections in an SS for joint scheduling of a scheduling cell and the weighted number of blind detections in an SS for single scheduling of the scheduling cell is less than or equal to the maximum number I of blind detections in the scheduling cell of the UE.

In a possible implementation, the monitoring module 72 is specifically configured to allocate, based on the target excess of the first target SS, the number of blind detections to the first target SS or an SS having an excess in the first target SS, and monitor the first target SS or the SS having the excess in the first target SS.

In a possible implementation, the number of blind detections corresponding to an SS for scheduling a primary cell from a secondary cell is a difference between the number of blind detections configured for the SS for scheduling the primary cell from the secondary cell and a total excess of blind detections corresponding to the SS for scheduling the primary cell from the secondary cell; and/or the number of blind detections in an SS for self-scheduling of the primary cell is a difference between the number of blind detections configured for the SS for self-scheduling of the primary cell and a total excess of blind detections corresponding to the SS for self-scheduling of the primary cell; and/or the number of blind detections in an SS for joint scheduling is a difference between the number of blind detections configured for the joint SS and a total excess of blind detections corresponding to the joint SS.

In a possible implementation, the priority information of the first target SS is configured by a network device, or prescribed by a protocol, or determined by the UE; the weight of the first target SS is configured by the network device, or prescribed by the protocol, or determined by the UE; and the target excess is configured by the network device, or prescribed by the protocol, or determined by the UE.

In a possible implementation, the weight of the first target SS and/or the target excess are/is determined by at least one of the following: an associated cell type, the number of associated cells, an associated subcarrier spacing SCS, an associated SS type, a time domain resource of an associated SS, a frequency domain resource of an associated SS, an associated SS period, an associated DCI format, the maximum number of blind detections of the UE, a total excess of blind detections, and a parameter configuration.

In a possible implementation, the SS for scheduling the primary cell from the secondary cell and/or the SS for joint scheduling are/is associated with at least one of the following: a preset cell type, the preset number of cells, a preset SCS, a preset period, a preset DCI format, a preset DCI type, a preset aggregation level, a preset time domain length, a preset time domain position, a preset frequency domain position, and a preset identifier.

In a possible implementation, a downlink control channel of the SS for scheduling the primary cell from the secondary cell corresponds to at least one of the following: a first preset cell type, the first preset number of cells, a first preset SCS, a first preset period, a first preset DCI format, a first preset DCI type, a first preset aggregation level, a first preset time domain length, a first preset time domain position, a first preset frequency domain position, and a first preset identifier.

In a possible implementation, a downlink control channel of an SS for scheduling at least two cells corresponds to at least one of the following: a second preset cell type, the second preset number of cells, a second preset SCS, a second preset period, a second preset DCI format, a second preset DCI type, a second preset aggregation level, a second preset time domain length, a second preset time domain position, a second preset frequency domain position, and a second preset identifier.

The UE provided in this embodiment of the present invention is capable of implementing each process implemented by the UE in the foregoing method embodiment. To avoid repetition, the detailed description is not repeated herein.

An embodiment of the present invention provides UE. In a CA scenario or a scenario that a secondary cell schedules a primary cell, the UE may determine, from a first target SS directly based on configuration information and/or blind detection resource allocation information, the number of actual blind detections in an SS monitored by the UE, and then monitor the SS based on the number of blind detections, instead of determining the number of actual blind detections in the SS to be monitored by the UE and monitoring the SS based on a plurality of pieces of DCI for scheduling or a part of DCI for scheduling the primary cell in the secondary cell. Therefore, blocking of a plurality of UEs in a process of monitoring the SS can be avoided, and a communication capability of the UE can be improved.

Figure 11:
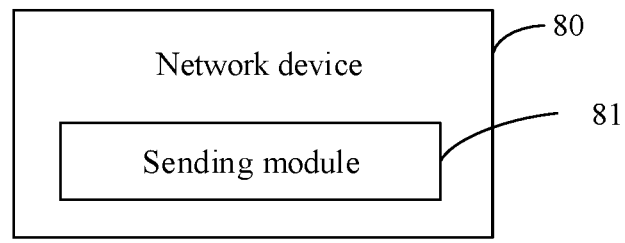
FIG. 11 is a first schematic structural diagram of a network device according to an embodiment of the present invention.

FIG. 11 is a possible schematic structural diagram of a network device in an embodiment of the present invention. As shown in FIG. 11, the network device 80 provided in this embodiment of the present invention may include a sending module 81.

The sending module 81 is configured to send target information to UE, where the target information includes at least one of the following: first configuration information of a first target SS and blind detection resource allocation information of the first target SS, the first configuration information is used to indicate the number of blind detections in the first target SS, the blind detection resource allocation information is used to allocate the number of blind detections to an SS in the first target SS, the number of blind detections includes at least one of the following: the number of downlink control channel candidates and the number of channel estimations, and the target information is used by the UE to monitor a second target SS in the first target SS.

In a possible implementation, the first target SS includes at least one of the following: an SS for self-scheduling of a primary cell, an SS for scheduling the primary cell by a secondary cell, another SS, an SS for joint scheduling, and an SS for single scheduling, where the another SS includes at least one of the following: an SS for self-scheduling of the secondary cell and an SS for scheduling another secondary cell by the secondary cell.

In a possible implementation, the configuration information includes at least one of the following: the number of blind detections in an SS for self-scheduling of a primary cell, the number of blind detections in an SS for scheduling the primary cell by a secondary cell, the number of blind detections in an SS of the primary cell, the number of blind detections in an SS of the secondary cell, the number of blind detections in an SS for self-scheduling of the secondary cell, the number of blind detections in an SS for scheduling another secondary cell by the secondary cell, the number of blind detections in an SS for scheduling a cell other than the primary cell by the secondary cell, the joint number of blind detections in an SS of the primary cell and an SS of the secondary cell, the number of blind detections in an SS of a scheduling cell, the number of blind detections in an SS for joint scheduling, the number of blind detections in an SS for single scheduling, and the number of blind detections corresponding to a scheduled cell in an SS for joint scheduling.

In a possible implementation, the number of blind detections in the first target SS, indicated by the first configuration information, satisfies at least one of the following: the number of blind detections in at least one SS in the first target SS is less than or equal to the maximum number of blind detections of the UE; and the joint number of blind detections in at least two SSs in the first target SS is less than or equal to the maximum joint number of blind detections of the UE.

In a possible implementation, at any unit time point, the second target SS is one SS.

In a possible implementation, the maximum number of blind detections of the UE includes at least one of the following: the maximum number X of blind detections corresponding to self-scheduling of the primary cell of the UE, the maximum number Y of blind detections corresponding to scheduling the primary cell from the secondary cell of the UE, the maximum number P of blind detections supported by the UE in the primary cell, the maximum number S of blind detections supported by the UE in the secondary cell, the maximum number F of blind detections corresponding to self-scheduling of the secondary cell of the UE, the maximum number O of blind detections corresponding to scheduling the another secondary cell by the secondary cell of the UE, the maximum number N of blind detections corresponding to scheduling the cell other than the primary cell by the secondary cell of the UE, and the maximum joint number T of blind detections supported by the UE in the primary cell and the secondary cell, where X, Y, P, S, F, O, and N are all natural numbers.

In a possible implementation, that the number of blind detections in at least one SS in the first target SS is less than or equal to the maximum number of blind detections of the UE includes at least one of the following: the number of blind detections in the SS for self-scheduling of the primary cell is less than or equal to X, the number of blind detections in the SS for scheduling the primary cell from the secondary cell is less than or equal to Y, and the number of blind detections in the another SS is less than or equal to S.

In a possible implementation, that the number of blind detections in at least one SS in the first target SS is less than or equal to the maximum number of blind detections of the UE includes at least one of the following: the number of blind detections in the SS for self-scheduling of the primary cell is less than or equal to X, the number of blind detections in the SS for scheduling the primary cell from the secondary cell is less than or equal to Y, and the number of blind detections in the SS for self-scheduling of the primary cell is less than or equal to P.

In a possible implementation, that the joint number of blind detections in at least two SSs in the first target SS is less than or equal to the maximum joint number of blind detections of the UE or that the joint number of blind detections in at least two SSs in the second target SS is less than or equal to the maximum joint number of blind detections of the UE includes at least one of the following: the number of blind detections in a third target SS is less than or equal to a first value, the number of blind detections in the third target SS is less than or equal to P, and the number of blind detections in a fourth target SS is less than or equal to S, where the third target SS includes the SS for self-scheduling of the primary cell and the SS for scheduling the primary cell from the secondary cell, the first value is a sum of X and Y, and the fourth target SS includes the SS for scheduling the primary cell from the secondary cell and the another SS.

In a possible implementation, the maximum number of blind detections of the UE includes at least one of the following: the maximum number I of blind detections in the scheduling cell of the UE, the maximum number J of blind detections corresponding to joint scheduling of the UE, the maximum number K of blind detections corresponding to single scheduling of the UE, and the maximum number $J_i$ of blind detections corresponding to the scheduled cell in M cells of the UE, where, i=0, 1, ..., M−1, the M cells are cells in a plurality of cells for joint scheduling, M is a positive integer, and J and $J_i$ are both natural numbers.

In a possible implementation, that the number of blind detections in at least one SS in the first target SS is less than or equal to the maximum number of blind detections of the UE includes at least one of the following: the number of blind detections in the SS for joint scheduling is less than or equal to J, and the number of blind detections corresponding to the scheduled cell in the SS for joint scheduling is less than or equal to $J_i$.

In a possible implementation, that the joint number of blind detections in at least two SSs in the first target SS is less than or equal to the maximum joint number of blind detections of the UE includes at least one of the following: the number of blind detections in a third target SS is less than or equal to a first value, the number of blind detections in the third target SS is less than or equal to P, the number of blind detections in a fourth target SS is less than or equal to S, and the number of blind detections in a fifth target SS is less than or equal to I. The third target SS includes the SS for self-scheduling of the primary cell and the SS for scheduling the primary cell from the secondary cell, the first value is a sum of X and Y, the fourth target SS includes the SS for scheduling the primary cell from the secondary cell and the another SS, the fifth target SS includes the SS for joint scheduling and the SS for single scheduling, and I is a natural number.

Figure 12:
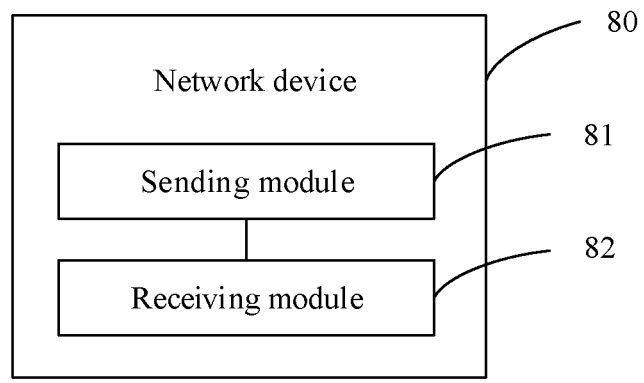
FIG. 12 is a second schematic structural diagram of a network device according to an embodiment of the present invention.

In a possible implementation, with reference to FIG. 11, as shown in FIG. 12, the network device provided in this embodiment of the present invention may further include a receiving module 82. The receiving module 82 is configured to receive first information sent by the UE, where the first information is used to indicate the maximum number of blind detections of the UE.

In a possible implementation, the sending module 81 is further configured to send second configuration information to the UE, where the second configuration information is used to configure the maximum number of blind detections for the UE.

In a possible implementation, the blind detection resource allocation information includes at least one of the following: priority information of the first target SS, a weight of the first target SS, and a target excess of the first target SS, where the target excess is an excess number of blind detections in the first target SS relative to the maximum number of blind detections of the UE.

In a possible implementation, the weight of the first target SS and/or the target excess are/is determined by at least one of the following: an associated cell type, the number of associated cells, an associated SCS, an associated SS type, a time domain resource of an associated SS, a frequency domain resource of an associated SS, an associated SS period, an associated DCI format, the maximum number of blind detections of the UE, a total excess of blind detections, and a parameter configuration.

In a possible implementation, the SS for scheduling the primary cell from the secondary cell and/or the SS for joint scheduling are/is associated with at least one of the following: a preset cell type, the preset number of cells, a preset SCS, a preset period, a preset DCI format, a preset DCI type, a preset aggregation level, a preset time domain length, a preset time domain position, a preset frequency domain position, and a preset identifier.

In a possible implementation, a downlink control channel of the SS for scheduling the primary cell from the secondary cell corresponds to at least one of the following: a first preset cell type, the first preset number of cells, a first preset SCS, a first preset period, a first preset DCI format, a first preset DCI type, a first preset aggregation level, a first preset time domain length, a first preset time domain position, a first preset frequency domain position, and a first preset identifier.

In a possible implementation, a downlink control channel of an SS for scheduling at least two cells corresponds to at least one of the following: a second preset cell type, the second preset number of cells, a second preset SCS, a second preset period, a second preset DCI format, a second preset DCI type, a second preset aggregation level, a second preset time domain length, a second preset time domain position, a second preset frequency domain position, and a second preset identifier.

The network device provided in this embodiment of the present invention is capable of implementing each process implemented by the network device in the foregoing method embodiment. To avoid repetition, the detailed description is not repeated herein.

An embodiment of the present invention provides a network device. The network device may send target information to UE, so that in a CA scenario or a scenario that a secondary cell schedules a primary cell, the UE may determine, from a first target SS directly based on first configuration information and/or blind detection resource allocation information, the number of actual blind detections in an SS to be monitored by the UE, and then monitor the SS based on the number of blind detections, instead of determining the number of actual blind detections in the SS to be monitored by the UE and monitoring the SS based on a plurality of pieces of DCI for scheduling or a part of DCI for scheduling the primary cell in the secondary cell. Therefore, blocking of a plurality of UEs in a process of monitoring the SS can be avoided, and a communication capability of the UE can be improved.

Figure 13:
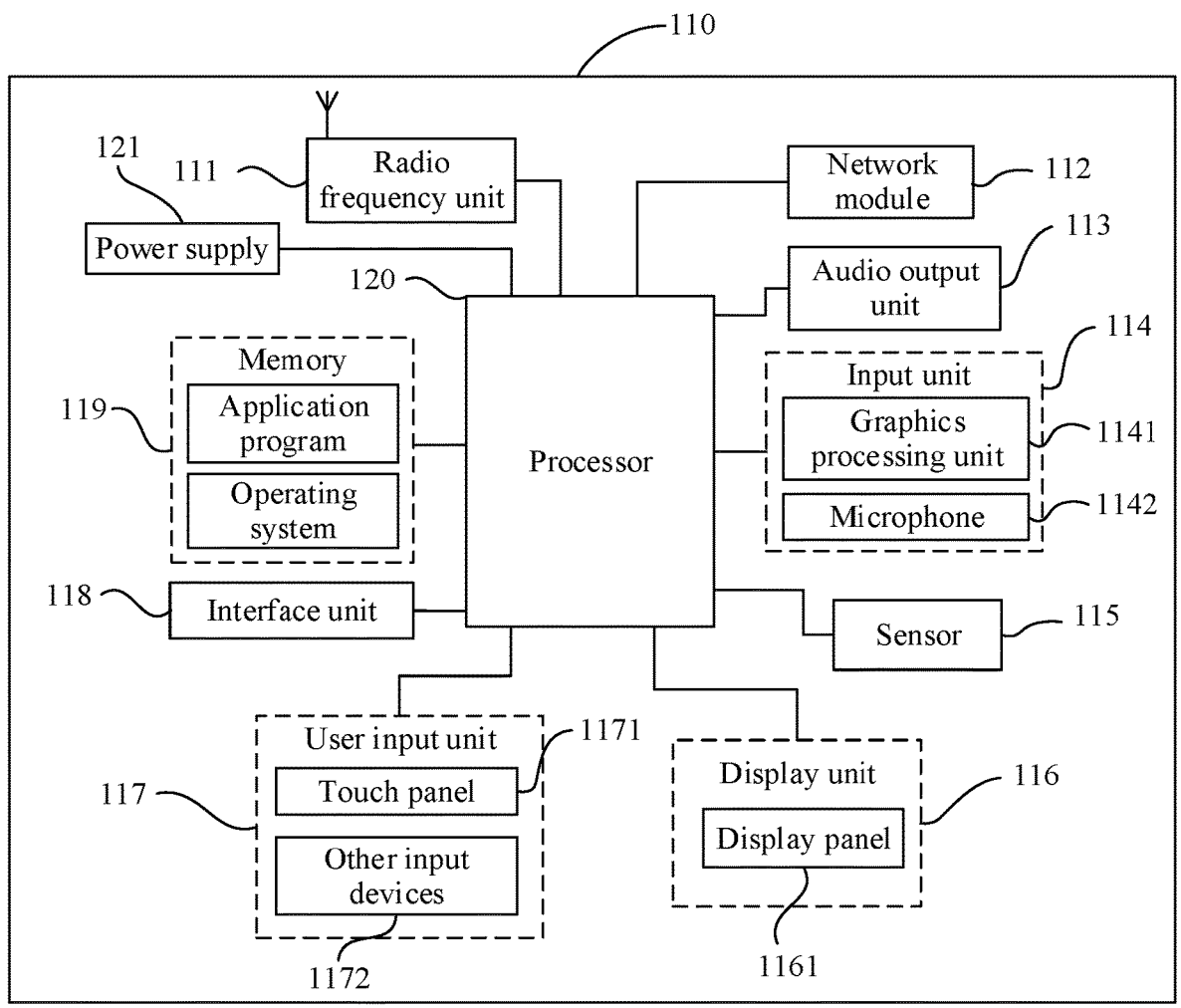
FIG. 13 is a schematic hardware diagram of UE according to an embodiment of the present invention.

FIG. 13 is a schematic hardware diagram of UE according to an embodiment of the present invention. As shown in FIG. 13, the UE 110 includes but is not limited to components such as a radio frequency unit 111, a network module 112, an audio output unit 113, an input unit 114, a sensor 115, a display unit 116, a user input unit 117, an interface unit 118, a memory 119, a processor 120, and a power supply 121.

It should be noted that a person skilled in the art can understand that the structure of the UE shown in FIG. 13 does not constitute any limitation on the UE. The UE may include more or fewer components than those shown in FIG. 13, or a combination of some components, or the components disposed differently. For example, in this embodiment of the present invention, the UE includes but is not limited to a mobile phone, a tablet computer, a notebook computer, a palmtop computer, an in-vehicle terminal, a wearable device, a pedometer, or the like.

The processor 120 is configured to obtain target information, and monitor a second target SS in a first target SS based on the target information. The target information includes at least one of the following: configuration information of the first target SS and blind detection resource allocation information of the first target SS, the configuration information is used to indicate the number of blind detections in the first target SS, the blind detection resource allocation information is used to allocate the number of blind detections to an SS in the first target SS, and the number of blind detections includes at least one of the following: the number of downlink control channel candidates and the number of channel estimations.

An embodiment of the present invention provides UE. In a CA scenario or a scenario that a secondary cell schedules a primary cell, the UE may determine, from a first target SS directly based on configuration information and/or blind detection resource allocation information, the number of actual blind detections in an SS monitored by the UE, and then monitor the SS based on the number of blind detections, instead of determining the number of actual blind detections in the SS to be monitored by the UE and monitoring the SS based on a plurality of pieces of DCI for scheduling or a part of DCI for scheduling the primary cell in the secondary cell. Therefore, blocking of a plurality of UEs in a process of monitoring the SS can be avoided, and a communication capability of the UE can be improved.

It should be understood that in this embodiment of the present invention, the radio frequency unit 111 may be configured to receive and send signals in an information reception or transmission or call process. Specifically, after receiving downlink data from a base station, the radio frequency unit 111 sends the downlink data to the processor 120 for processing, and in addition, sends uplink data to the base station. Generally, the radio frequency unit 111 includes but is not limited to an antenna, at least one amplifier, a transceiver, a coupler, a low noise amplifier, a duplexer, and the like. In addition, the radio frequency unit 111 may also communicate with a network and other devices via a wireless communications system.

The UE provides wireless broadband Internet access for a user by using the network module 112, for example, helps the user send and receive e-mails, browse web pages, and access streaming media.

The audio output unit 113 may convert audio data received by the radio frequency unit 111 or the network module 112 or stored in the memory 119 into an audio signal and output the audio signal as a sound. In addition, the audio output unit 113 may also provide an audio output (for example, a call signal reception sound or a message reception sound) related to a specific function performed by the UE 110. The audio output unit 113 includes a speaker, a buzzer, a receiver, and the like.

The input unit 114 is configured to receive an audio or video signal. The input unit 114 may include a graphics processing unit (GPU) 1141 and a microphone 1142. The graphics processing unit 1141 processes image data of a still picture or video obtained by an image capture apparatus (such as a camera) in a video capture mode or an image capture mode. A processed image frame may be displayed on the display unit 116. The image frame processed by the graphics processing unit 1141 may be stored in the memory 119 (or another storage medium) or be sent by the radio frequency unit 111 or the network module 112. The microphone 1142 is capable of receiving sounds and processing such sounds into audio data. The processed audio data can be converted into a format output that can be sent to a mobile communication base station through the radio frequency unit 111 in a telephone call mode.

The UE 110 further includes at least one sensor 115, for example, an optical sensor, a motion sensor, and another sensor. Specifically, the optical sensor includes an ambient light sensor and a proximity sensor. The ambient light sensor may adjust luminance of the display panel 1161 based on brightness of ambient light, and the proximity sensor may turn off the display panel 1161 and/or backlight when the UE 110 moves close to an ear. As a type of motion sensor, an accelerometer sensor may detect acceleration magnitudes in all directions (generally three axes), and when the accelerometer sensor is stationary, may detect a magnitude and a direction of gravity, and may be configured to recognize a posture of the UE (such as switching between landscape and portrait, related games, and magnetometer posture calibration), implement vibration recognition related functions (such as a pedometer and stroke), and the like. The sensor 115 may further include a fingerprint sensor, a pressure sensor, an iris sensor, a molecular sensor, a gyroscope, a barometer, a hygrometer, a thermometer, an infrared sensor, and the like. Details are not described herein.

The display unit 116 is configured to display information input by the user or information provided to the user. The display unit 116 may include the display panel 1161, and the display panel 1161 may be configured in a form of a liquid crystal display (LCD), an organic light-emitting diode (OLED), or the like.

The user input unit 117 may be configured to receive input digit or character information, and generate a key signal input related to a user setting and function control of the UE. Specifically, the user input unit 117 includes a touch panel 1171 and other input devices 1172. The touch panel 1171 is also referred to as a touchscreen and can collect a touch operation (such as an operation performed by the user on the touch panel 1171 or near the touch panel 1171 with a finger or by using any proper object or accessory such as a stylus) of the user on or near the touch panel 1171. The touch panel 1171 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and sends the touchpoint coordinates to the processor 120, and receives a command sent by the processor 120 and executes the command. In addition, the touch panel 1171 may be implemented in a plurality of forms, for example, as a resistive, capacitive, infrared, or surface acoustic wave touch panel. The user input unit 117 may further include other input devices 1172 in addition to the touch panel 1171. Specifically, the other input devices 1172 may include but are not limited to a physical keyboard, a function key (such as a volume control key or a switch key), a trackball, a mouse, and a joystick. Details are not described herein.

Further, the touch panel 1171 may cover the display panel 1161. When detecting a touch operation on or near the touch panel 1171, the touch panel 1171 transmits the touch operation to the processor 120 to determine a type of a touch event. Then, the processor 120 provides a corresponding visual output on the display panel 1161 based on the type of the touch event. Although in FIG. 13, the touch panel 1171 and the display panel 1161 act as two independent parts to implement input and output functions of the UE, in some embodiments, the touch panel 1171 and the display panel 1161 may be integrated to implement the input and output functions of the UE. This is not specifically limited herein.

The interface unit 118 is an interface between an external apparatus and the UE 110. For example, an external apparatus may include a wired or wireless headset port, an external power supply (or a battery charger) port, a wired or wireless data port, a memory port, a port for connecting an apparatus with an identification module, an audio input/output (I/O) port, a video I/O port, an earphone port, and the like. The interface unit 118 may be configured to receive an input (for example, data information or power) from an external apparatus and transmit the received input to one or more elements within the UE 110, or may be configured to transmit data between the UE 110 and the external apparatus.

The memory 119 may be configured to store software programs and various data. The memory 119 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 119 may include a high-speed random access memory, and may further include a non-volatile memory such as at least one disk storage device, a flash memory device, or another volatile solid-state storage device.

The processor 120 is a control center of the UE. The processor 120 uses various interfaces and lines to connect all parts of the entire UE, and performs various functions and data processing of the UE by running or executing the software program and/or module stored in the memory 119 and invoking data stored in the memory 119, thereby performing overall monitoring on the UE. The processor 120 may include one or more processing units. Optionally, an application processor and a modem processor may be integrated in the processor 120. The application processor primarily processes an operating system, user interfaces, application programs, and the like. The modem processor primarily processes radio communication. It may be understood that the modem processor may alternatively be not integrated in the processor 120.

The UE 110 may further include the power supply 121 (for example, a battery) supplying power to all components. Optionally, the power supply 121 may be logically connected to the processor 120 through a power management system. In this way, functions such as charge management, discharge management, and power consumption management are implemented by using the power management system.

In addition, the UE 110 includes some functional modules that are not shown. Details are not described herein.

Optionally, an embodiment of the present invention further provides UE, including a processor 120, a memory 119, and a computer program stored in the memory 119 and capable of running on the processor 120, as shown in FIG. 13. When the computer program is executed by the processor 120, each process of the foregoing method embodiment is implemented, with the same technical effect achieved. To avoid repetition, details are not described herein again.

An embodiment of the present invention further provides a computer-readable storage medium, where the computer-readable storage medium stores a computer program. When the computer program is executed by the processor 120 shown in FIG. 13, each process of the foregoing method embodiment is implemented, with the same technical effect achieved. To avoid repetition, details are not described herein again. The computer-readable storage medium is, for example, a read-only memory (ROM), a random access memory (RAM), a magnetic disk, or an optical disc.

Figure 14:
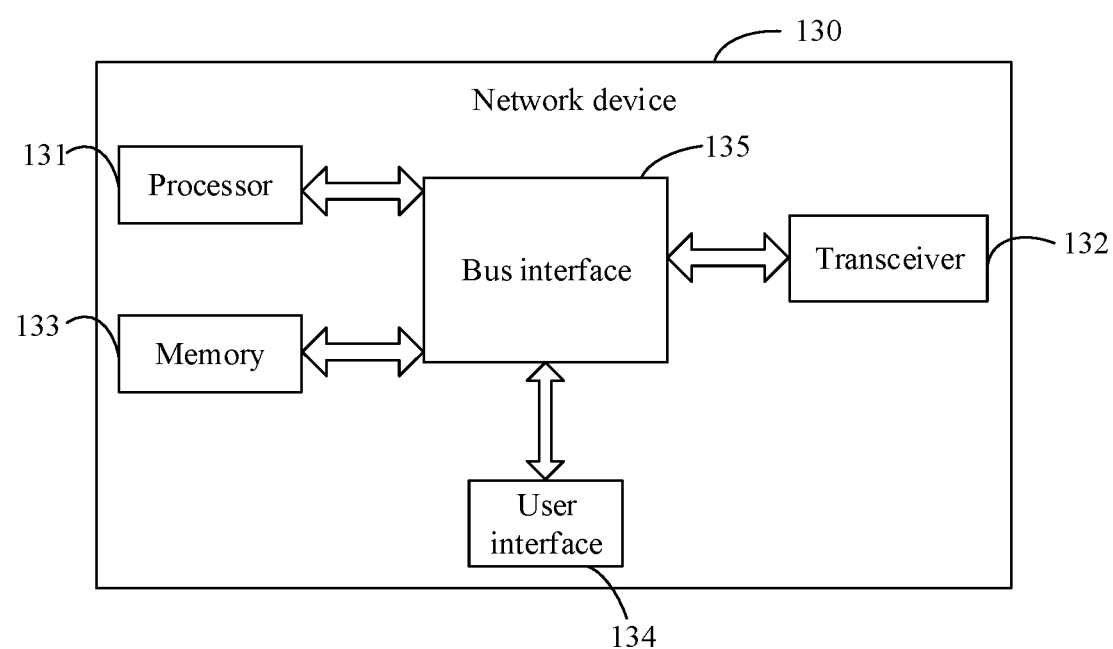
FIG. 14 is a schematic hardware diagram of a network device according to an embodiment of the present invention.

FIG. 14 is a schematic hardware diagram of a network device according to an embodiment of the present invention. As shown in FIG. 14, the network device 130 includes a processor 131, a transceiver 132, a memory 133, a user interface 134, and a bus interface 135.

The transceiver 132 is configured to send target information to UE, where the target information includes at least one of the following: first configuration information of a first target SS and blind detection resource allocation information of the first target SS, the first configuration information is used to indicate the number of blind detections in the first target SS, the blind detection resource allocation information is used to allocate the number of blind detections to an SS in the first target SS, the number of blind detections includes at least one of the following: the number of downlink control channel candidates and the number of channel estimations, and the target information is used by the UE to monitor a second target SS in the first target SS.

An embodiment of the present invention provides a network device. The network device may send target information to UE, so that in a CA scenario or a scenario that a secondary cell schedules a primary cell, the UE may determine, from a first target SS directly based on first configuration information and/or blind detection resource allocation information, the number of actual blind detections in an SS to be monitored by the UE, and then monitor the SS based on the number of blind detections, instead of determining the number of actual blind detections in the SS to be monitored by the UE and monitoring the SS based on a plurality of pieces of DCI for scheduling or a part of DCI for scheduling the primary cell in the secondary cell. Therefore, blocking of a plurality of UEs in a process of monitoring the SS can be avoided, and a communication capability of the UE can be improved.

The processor 131 may be responsible for managing a bus architecture and usual processing, and the processor 131 may be configured to read and execute programs in the memory 133 to implement processing functions and control of the network device 130. The memory 133 may store data that is used when the processor 131 performs an operation. The processor 131 and the memory 133 may be integrated, or separately disposed.

In this embodiment of the present invention, the network device 130 may further include a computer program stored in the memory 133 and capable of running on the processor 131. When the computer program is executed by the processor 131, the steps of the methods provided in the embodiments of the present invention are implemented.

In FIG. 14, a bus architecture may include any quantity of interconnected buses and bridges, and specifically connects together circuits that are of one or more processors represented by the processor 131 and of a memory represented by the memory 133. The bus architecture may further interconnect various other circuits such as a peripheral device, a voltage regulator, and a power management circuit. These are all well known in the art, and therefore are not further described in the embodiments of the present invention. The bus interface 135 provides an interface. The transceiver 132 may be a plurality of components, including a transmitter and a receiver, and provides units for communicating with a variety of other apparatuses on a transmission medium. For different UEs, the user interface 134 may also be an interface that can be externally or internally connected to a required device. The connected device includes but is not limited to a keypad, a display, a speaker, a microphone, a joystick, and the like.

An embodiment of the present invention further provides a computer-readable storage medium, where the computer-readable storage medium stores a computer program. When the computer program is executed by the processor 131 shown in FIG. 14, each process of the foregoing method embodiment is implemented, with the same technical effect achieved. To avoid repetition, details are not described herein again. The computer-readable storage medium is, for example, a ROM, a RAM, a magnetic disk, or an optical disc.

It should be noted that in the embodiments of the present invention, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, a person of ordinary skill in the art may develop many other manners without departing from principles of this application and the protection scope of the claims, and all such manners fall within the protection scope of this application.

What is claimed is:

1. A search space (SS) monitoring method, applied to user equipment (UE), wherein the method comprises:
   obtaining target information, wherein the target information comprises at least one of the following: configuration information of a first target SS and blind detection resource allocation information of the first target SS, the configuration information is used to indicate the number of blind detections in the first target SS, the blind detection resource allocation information is used to allocate the number of blind detections to an SS in the first target SS, and the number of blind detections comprises at least one of the following: the number of downlink control channel candidates and the number of channel estimations; and
   monitoring a second target SS in the first target SS based on the target information;
   wherein a maximum number of blind detections of the UE comprises at least one of the following: a maximum number X of blind detections corresponding to self-scheduling of a primary cell of the UE, a maximum number Y of blind detections corresponding to scheduling the primary cell from a secondary cell of the UE, a maximum number P of blind detections supported by the UE in the primary cell, or a maximum number S of blind detections supported by the UE in the secondary cell, wherein X, Y, P, and S are all natural numbers;
   wherein the number of blind detections in a third target SS is less than or equal to P, wherein the third target SS comprises an SS for self-scheduling of the primary cell and an SS for scheduling the primary cell from the secondary cell.

2. The method according to claim 1, wherein the first target SS comprises at least one of the following: the SS for self-scheduling of the primary cell, the SS for scheduling the primary cell from the secondary cell, another SS, an SS for joint scheduling, and an SS for single scheduling, wherein
   the another SS comprises at least one of the following: an SS for self-scheduling of the secondary cell and an SS for scheduling another secondary cell from the secondary cell.

3. The method according to claim 1, wherein the configuration information comprises at least one of the following: the number of blind detections in the SS for self-scheduling of the primary cell, the number of blind detections in the SS for scheduling the primary cell from the secondary cell, the number of blind detections in an SS of the primary cell, the number of blind detections in an SS of the secondary cell, the number of blind detections in an SS for self-scheduling of the secondary cell, the number of blind detections in an SS for scheduling another secondary cell from the secondary cell, the number of blind detections in an SS for scheduling a cell other than the primary cell from the secondary cell, the joint number of blind detections in an SS of the primary cell and an SS of the secondary cell, the number of blind detections in an SS of a scheduling cell, the number of blind detections in an SS for joint scheduling, the number of blind detections in an SS for single scheduling, and the number of blind detections corresponding to a scheduled cell in an SS for joint scheduling.

4. The method according to claim 1, wherein the number of blind detections in the first target SS, indicated by the configuration information, satisfies at least one of the following:
   the number of blind detections in at least one SS in the first target SS is less than or equal to the maximum number of blind detections of the UE; and
   the joint number of blind detections in at least two SSs in the first target SS is less than or equal to the maximum joint number of blind detections of the UE.

5. The method according to claim 1, wherein the number of blind detections in at least one SS in the second target SS is less than or equal to the maximum number of blind detections of the UE;
   and/or
   the joint number of blind detections in at least two SSs in the second target SS is less than or equal to the maximum joint number of blind detections of the UE.

6. The method according to claim 1, wherein the maximum number of blind detections of the UE further comprises at least one of the following: a maximum number F of blind detections corresponding to self-scheduling of the secondary cell of the UE, a maximum number O of blind detections corresponding to scheduling the another secondary cell from the secondary cell of the UE, a maximum number N of blind detections corresponding to scheduling the cell other than the primary cell from the secondary cell of the UE, and a maximum joint number T of blind detections supported by the UE in the primary cell and the secondary cell, wherein O, and N are all natural numbers.

7. The method according to claim 1, wherein that the number of blind detections in at least one SS in the first target SS is less than or equal to the maximum number of blind detections of the UE or that the number of blind detections in at least one SS in the second target SS is less than or equal to the maximum number of blind detections of the UE comprises at least one of the following: the number of blind detections in the SS for self-scheduling of the primary cell is less than or equal to X, the number of blind detections in the SS for scheduling the primary cell from the secondary cell is less than or equal to Y, and the number of blind detections in the another SS is less than or equal to S; or,
  wherein that the number of blind detections in at least one SS in the first target SS is less than or equal to the maximum number of blind detections of the UE or that the number of blind detections in at least one SS in the second target SS is less than or equal to the maximum number of blind detections of the UE comprises at least one of the following: the number of blind detections in the SS for self-scheduling of the primary cell is less than or equal to X, the number of blind detections in the SS for scheduling the primary cell from the secondary cell is less than or equal to Y, and the number of blind detections in the SS for self-scheduling of the primary cell is less than or equal to P; or,
  wherein that the joint number of blind detections in at least two SSs in the first target SS is less than or equal to the maximum joint number of blind detections of the UE or that the joint number of blind detections in at least two SSs in the second target SS is less than or equal to the maximum joint number of blind detections of the UE comprises at least one of the following: the number of blind detections in the third target SS is less than or equal to a first value, and the number of blind detections in a fourth target SS is less than or equal to S, wherein
  the first value is a sum of X and Y, and the fourth target SS comprises the SS for scheduling the primary cell from the secondary cell and the another SS.

8. The method according to claim 1, wherein a sum of the weighted number of blind detections in the SS for self-scheduling of the primary cell and the weighted number of blind detections in the SS for scheduling the primary cell from the secondary cell is less than or equal to P;
and/or
  a sum of the weighted number of blind detections in the SS for scheduling the primary cell from the secondary cell and the weighted number of blind detections in an SS in another SS is less than or equal to S.

9. The method according to claim 1, wherein Y=P−X, or X=P−Y.

10. A search space (SS) monitoring method, applied to a network device, wherein the method comprises:
  sending target information to user equipment (UE), wherein
  the target information comprises at least one of the following: first configuration information of a first target SS and blind detection resource allocation information of the first target SS, the first configuration information is used to indicate the number of blind detections in the first target SS, the blind detection resource allocation information is used to allocate the number of blind detections to an SS in the first target SS, the number of blind detections comprises at least one of the following: the number of downlink control channel candidates and the number of channel estimations, and the target information is used by the UE to monitor a second target SS in the first target SS;
  wherein a maximum number of blind detections of the UE comprises at least one of the following: a maximum number X of blind detections corresponding to self-scheduling of a primary cell of the UE, a maximum number Y of blind detections corresponding to scheduling the primary cell from a secondary cell of the UE, a maximum number P of blind detections supported by the UE in the primary cell, or a maximum number S of blind detections supported by the UE in the secondary cell, wherein X, Y, P, and S are all natural numbers;
  wherein the number of blind detections in a third target SS is less than or equal to P, wherein the third target SS comprises an SS for self-scheduling of the primary cell and an SS for scheduling the primary cell from the secondary cell.

11. The method according to claim 10, wherein the first target SS comprises at least one of the following: an SS for self-scheduling of the primary cell, an SS for scheduling the primary cell from the secondary cell, another SS, an SS for joint scheduling, and an SS for single scheduling, wherein
  the another SS comprises at least one of the following: an SS for self-scheduling of the secondary cell and an SS for scheduling another secondary cell from the secondary cell.

12. The method according to claim 10, wherein the first configuration information comprises at least one of the following: the number of blind detections in the SS for self-scheduling of the primary cell, the number of blind detections in the SS for scheduling the primary cell from the secondary cell, the number of blind detections in an SS of the primary cell, the number of blind detections in an SS of the secondary cell, the number of blind detections in an SS for self-scheduling of the secondary cell, the number of blind detections in an SS for scheduling another secondary cell from the secondary cell, the number of blind detections in an SS for scheduling a cell other than the primary cell from the secondary cell, the joint number of blind detections in an SS of the primary cell and an SS of the secondary cell, the number of blind detections in an SS of a scheduling cell, the number of blind detections in an SS for joint scheduling, the number of blind detections in an SS for single scheduling, and the number of blind detections corresponding to a scheduled cell in an SS for joint scheduling.

13. The method according to claim 10, wherein the number of blind detections in the first target SS, indicated by the first configuration information, satisfies at least one of the following:
  the number of blind detections in at least one SS in the first target SS is less than or equal to the maximum number of blind detections of the UE; and
  the joint number of blind detections in at least two SSs in the first target SS is less than or equal to the maximum joint number of blind detections of the UE.

14. The method according to claim 10, wherein the method further comprises:
  receiving first information sent by the UE, wherein the first information is used to indicate the maximum number of blind detections of the UE.

15. The method according to claim 10, wherein the method further comprises:
  sending second configuration information to the UE, wherein the second configuration information is used to configure the maximum number of blind detections for the UE.

16. A network device, comprising a processor, a memory, and a computer program stored in the memory and capable of running on the processor, wherein the computer program is executed by the processor, the steps of the search space SS monitoring method according to claim 10 are implemented.

17. User equipment (UE), comprising a processor, a memory, and a computer program stored in the memory and capable of running on the processor, wherein when the computer program is executed by the processor, the steps of a search space SS monitoring method are implemented, wherein the method comprises:
- obtaining target information, wherein the target information comprises at least one of the following: configuration information of a first target SS and blind detection resource allocation information of the first target SS, the configuration information is used to indicate the number of blind detections in the first target SS, the blind detection resource allocation information is used to allocate the number of blind detections to an SS in the first target SS, and the number of blind detections comprises at least one of the following: the number of downlink control channel candidates and the number of channel estimations; and
- monitoring a second target SS in the first target SS based on the target information;
- wherein a maximum number of blind detections of the UE comprises at least one of the following: a maximum number X of blind detections corresponding to self-scheduling of a primary cell of the UE, a maximum number Y of blind detections corresponding to scheduling the primary cell from a secondary cell of the UE, a maximum number P of blind detections supported by the UE in the primary cell, or a maximum number S of blind detections supported by the UE in the secondary cell, wherein X, Y, P, and S are all natural numbers;
- wherein the number of blind detections in a third target SS is less than or equal to P, wherein the third target SS comprises an SS for self-scheduling of the primary cell and an SS for scheduling the primary cell from the secondary cell.

18. The UE according to claim 17, wherein the first target SS comprises at least one of the following: the SS for self-scheduling of the primary cell, the SS for scheduling the primary cell from the secondary cell, another SS, an SS for joint scheduling, and an SS for single scheduling, wherein
- the another SS comprises at least one of the following: an SS for self-scheduling of the secondary cell and an SS for scheduling another secondary cell from the secondary cell.

* * * * *